(12) United States Patent
Gevorgyan et al.

(10) Patent No.: US 11,454,832 B2
(45) Date of Patent: Sep. 27, 2022

(54) MOSCAP RING RESONATOR OPTICAL MODULATOR

(71) Applicant: Trustees of Boston University, Boston, MA (US)

(72) Inventors: Hayk Gevorgyan, Somerville, MA (US); Milos Popovic, Lexington, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 17/557,263

(22) Filed: Dec. 21, 2021

(65) Prior Publication Data

US 2022/0206323 A1    Jun. 30, 2022

Related U.S. Application Data

(60) Provisional application No. 63/130,986, filed on Dec. 28, 2020.

(51) Int. Cl.
*G02F 1/015* (2006.01)
*G02F 1/025* (2006.01)

(52) U.S. Cl.
CPC ............ *G02F 1/0154* (2021.01); *G02F 1/025* (2013.01); *G02F 2202/104* (2013.01); *G02F 2202/105* (2013.01); *G02F 2203/50* (2013.01)

(58) Field of Classification Search
CPC .. G02F 1/0154; G02F 1/025; G02F 2202/104; G02F 2202/105; G02F 2203/50
See application file for complete search history.

(56) References Cited

U.S. PATENT DOCUMENTS 6,801,676 B1   10/2004   Liu
7,065,301 B2    6/2006   Shastri et al.
(Continued)

FOREIGN PATENT DOCUMENTS

WO    2021037855 A1    3/2021

OTHER PUBLICATIONS

International Search Report and Written Opinion for International Application No. PCT/US21/64606 dated Mar. 15, 2022.
(Continued)

*Primary Examiner* — Ellen E Kim
(74) *Attorney, Agent, or Firm* — Burns & Levinson LLP; Steven M. Mills

(57) ABSTRACT

A ring resonator optical modulator comprises: an optical region in which optical radiation can propagate in a circular path having an inner radius and an outer radius coincident with an outer perimeter of the ring resonator optical modulator; a MOS capacitor structure having an upper gate device layer and a lower body device layer, and an insulating material being disposed between the upper gate device layer and the lower body device layer; and a cladding region. The optical radiation is confined within the optical region. The insulating material has a first region disposed in the optical region having a first thickness and a second region having a second thickness greater than the first thickness, the second region being disposed radially inwardly from the inner radius of the optical region, such that the optical radiation is radially confined toward the outer side of the inner radius of the optical region.

29 Claims, 15 Drawing Sheets

(56) References Cited

U.S. PATENT DOCUMENTS

| | | | |
|---|---|---|---|
| 8,488,917 B2 | 7/2013 | Manipatruni et al. | |
| 9,360,688 B2 * | 6/2016 | Patel | G02F 1/2257 |
| 9,507,180 B2 | 11/2016 | Xu et al. | |
| 9,612,503 B2 | 4/2017 | Liang | |
| 10,133,098 B2 | 11/2018 | Chen et al. | |
| 10,586,847 B2 * | 3/2020 | Liang | H01L 21/76251 |
| 10,897,119 B1 * | 1/2021 | Kurczveil | H01S 5/0261 |
| 10,969,546 B2 * | 4/2021 | Zhang | G02B 6/12002 |
| 2004/0264828 A1 * | 12/2004 | Liu | G02F 1/025 385/3 |
| 2005/0220405 A1 | 10/2005 | Shappir | |
| 2009/0237770 A1 | 9/2009 | Kim | |
| 2015/0055910 A1 | 2/2015 | Liang | |

OTHER PUBLICATIONS

Liao et al., "High speed silicon Mach-Zehnder modulator," Optics Express, vol. 13, No. 8, 2005.
Passaro, "Scaling and Optimization of MOS Optical Modulators in Nanometer SOI Waveguides," IEEE Transactions on Nanotechnology, vol. 7, No. 4, 2008.
Webster et al., "An Efficient MOS-Capacitor based Silicon Modulator and CMOS Drivers for Optical Transmitters," IEEE, 2014.
Webster et al., "Silicon Photonic Modulator based on a MOS-Capacitor and a CMOS Driver," IEEE, 2014.
Abraham et al., "Highly efficient silicon capacitive modulators based on a vertical oxide layer," Proceedings of SPIE, 2016.
Fujikata et al., "High-performance MOS-capacitor-type Si optical modulator and surface-illumination-type Ge photodetector for optical interconnection," Japanese Journal of Applied Physics, 55, 04EC01, 2016.
Hiraki et al., "Heterogeneously intergrated III-V/Si MOS capacitor Mach-Zehnder modulator," Nature Photonics, vol. 11, 2017.
Hiraki et al., "Heterogeneously intergrated III-V/Si MOS capacitor Mach-Zehnder modulator," Nature Photonics, Supplementary Information, 2017.
Amin et al., "0.52 V mm ITO-based Mach-Zehnder modulator in silicon photonics," APL Photonics 3, 126104, 2018.
Debnath et al., "20Gbps silicon lateral MOS-Capacitor electro-optic modulator," CLEO, 2018.
Hiraki et al., "III-V/Si MOS Capacitor Mach-Zehnder Modulator with Low Temperature Sensitivity," IEEE, 2019.
Fujikata et al., "High-Efficiency of Narrow-Width MOS Capacitor Type Si Optical Modulator with TM Mode Excitation," IEEE, 2019.
Amin et al., "A Lateral MOS-Capacitor Enabled ITO Mach-Zehnder Modulator for Beam Steering," JLT-24410, 2019.
Li et al., "Efficient Optical Modulator by Reverse-biased III-V/Si Hybrid MOS Capacitor based on FK Effect and Carrier Depletion," OSA 2019.
Taguchi et al., "Numerical analysis of Ge/Si hybrid MOS optical modulator operating at mid-infrared wavelength," Japanese Journal of Applied Physics, 58, SBBE03, 2019.
Perez-Galacho et al., "Silicon modulator based on interleaved capacitors in subwavelength grating waveguides," Proc. of SPIE, vol. 9891, 989112-1, 2016.
Li et al., "High-Speed Compact Silicon Nanocavitiy Modulator with Transparent Conductive Oxide Gate," Frontiers in Optics/Laser Science, 2019.
Soref et al., "Low-energy MOS depletion modulators in silicon-on-insulator micro-donut resonators coupled to bus waveguides," Optics Express, vol. 19, No. 19, 2011.
Van Campenhout et al., "Low-Voltage, Low-Loss, Multi-GB/s Silicon Micro-Ring Modulator based on a MOS Capacitor," OFC/NFOEC Technical Digest, 2012.
Liang et al., "A Tunable Hybrid III-V-on-Si MOS Microring Resonator with Negligible Tuning Power Consumption," Optical Society of America, 2016.
Li et al., "Silicon Microring Modulator with Transparent Conductive Oxide Gate," IEEE, 2019.
Li et al., "Transparent conductive oxide-gated silicon microring with extreme resonance wavelength tunability," Photonics Research, vol. 7, No. 4, 2019.
Timurdogan et al., "An Interior-Ridge Silicon Microring Modulator," Journal of Lightwave Technology, vol. 31, No. 24, 2013.
Timurdogan et al., "An ultralow power athermal silicon modulator," Nature Communications, 2014.
Xu et al., "Micrometre-scale silicon electro-optic modulator," Nature, vol. 435, 2005.
Liu et al., "A high-speed silicon optical modulator based on a metal-oxide-semiconductor capacitor," Nature, vol. 427, 2004.

* cited by examiner

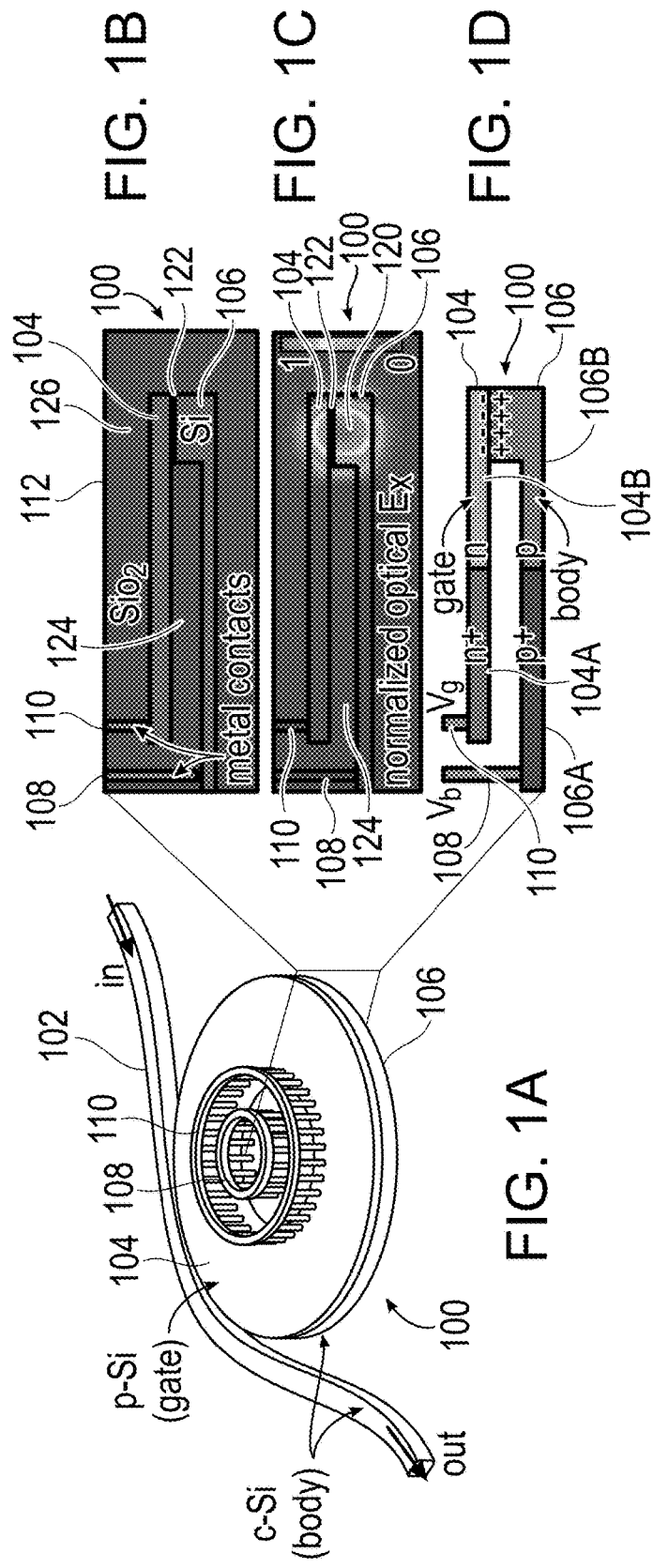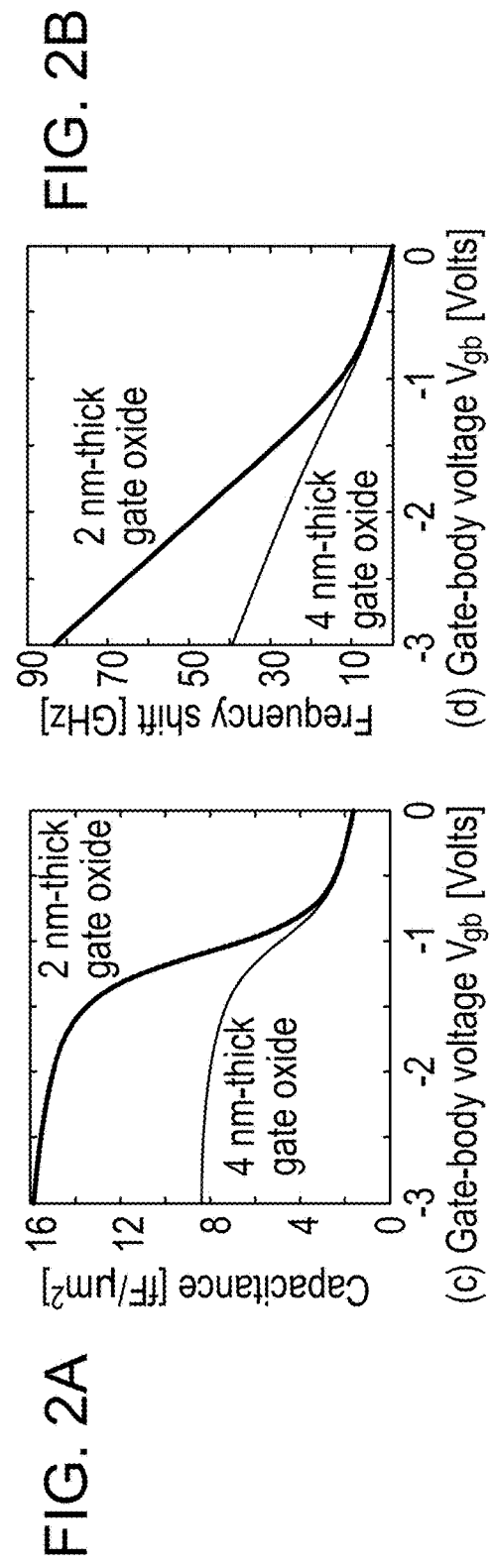

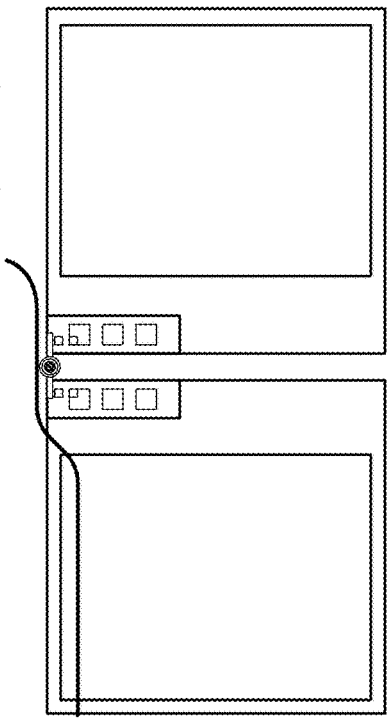
FIG. 3B
MOSCAP modulator electrical probe pads
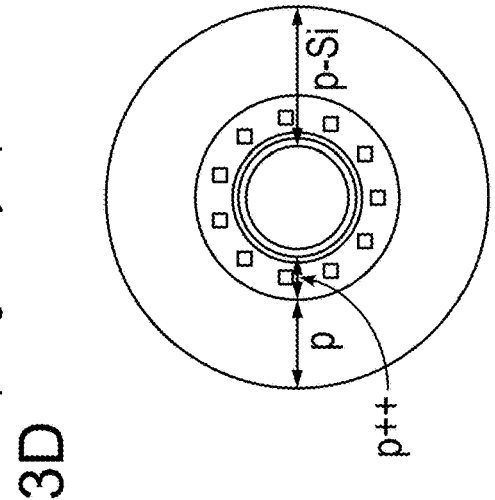
FIG. 3D
p-Si gate layer pattern
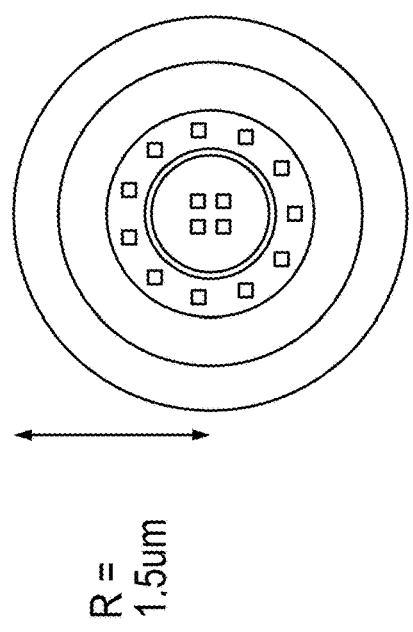
FIG. 3A  complete optical structure
R = 1.5um
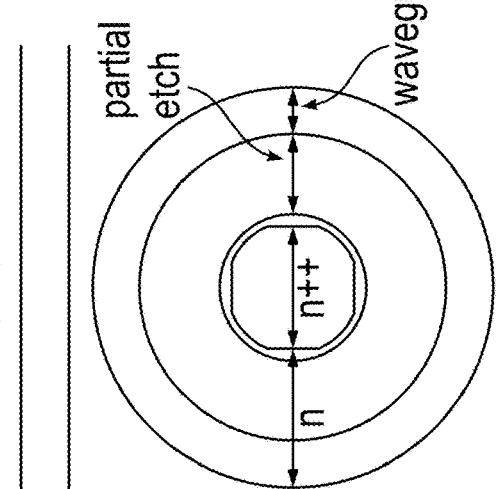
FIG. 3C  c-Si body layer pattern

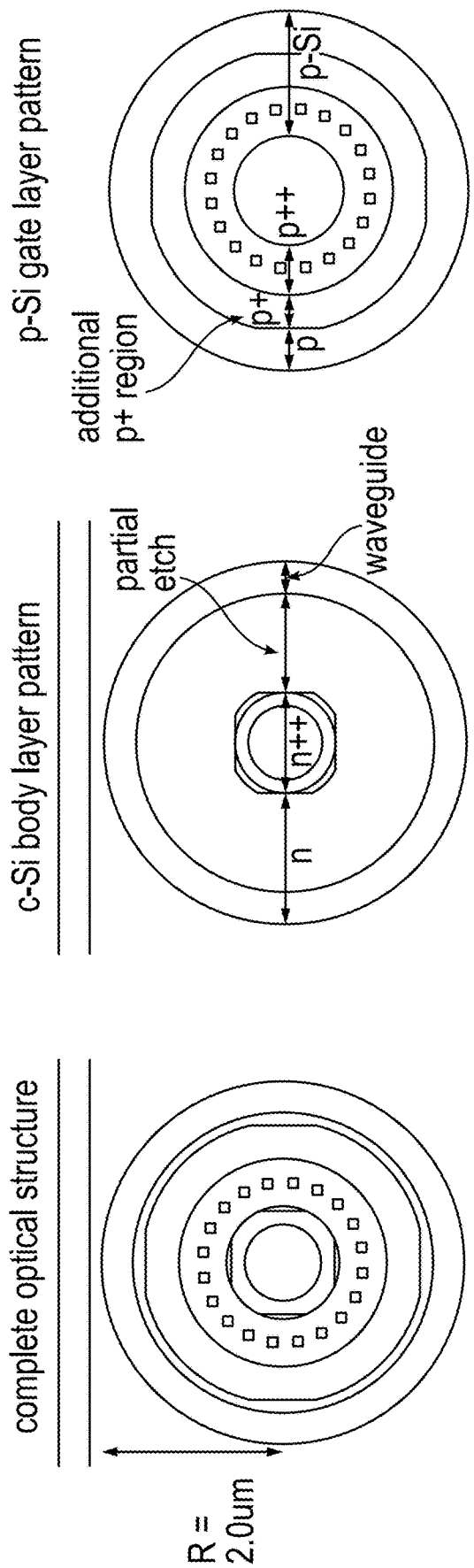

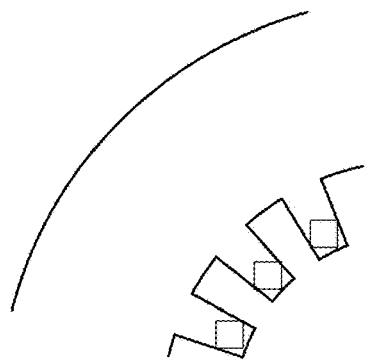
FIG. 9D
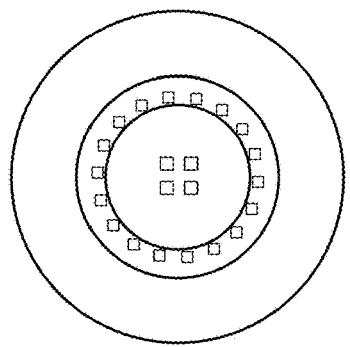
FIG. 9C
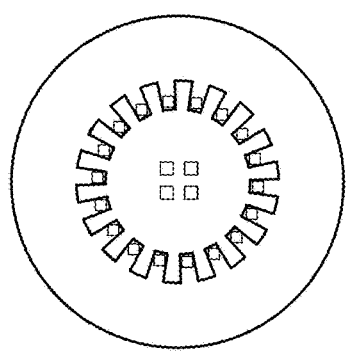
FIG. 9B
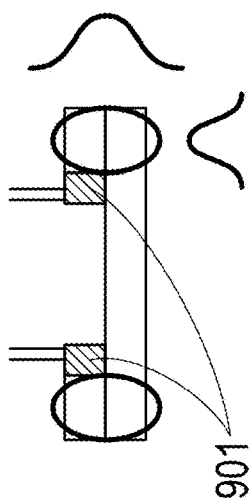
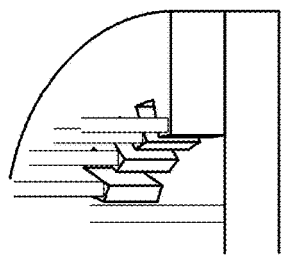
FIG. 9A

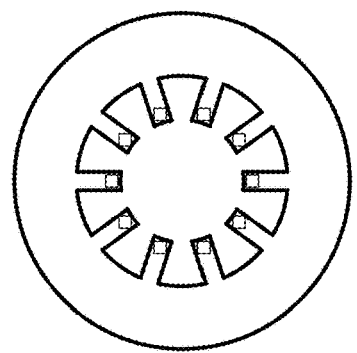
FIG. 10D
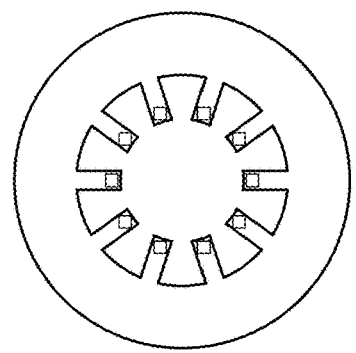
FIG. 10C
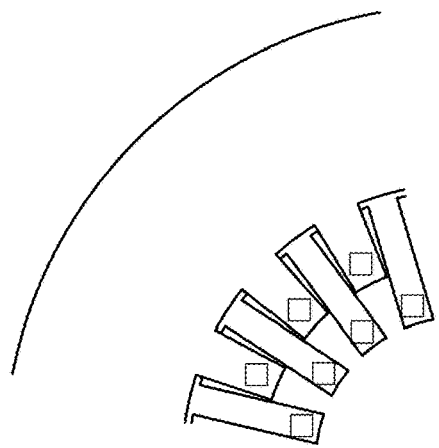
FIG. 10B
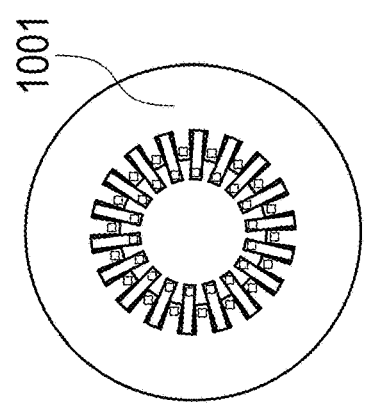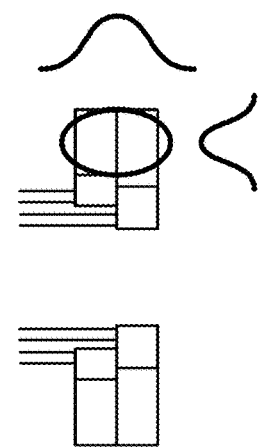
FIG. 10A

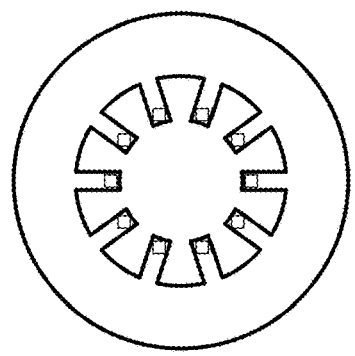
FIG. 11D
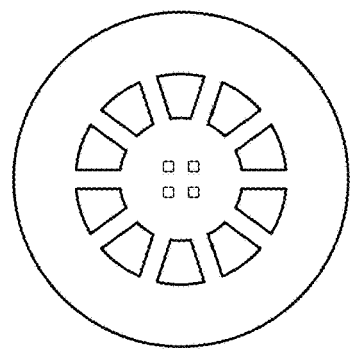
FIG. 11C
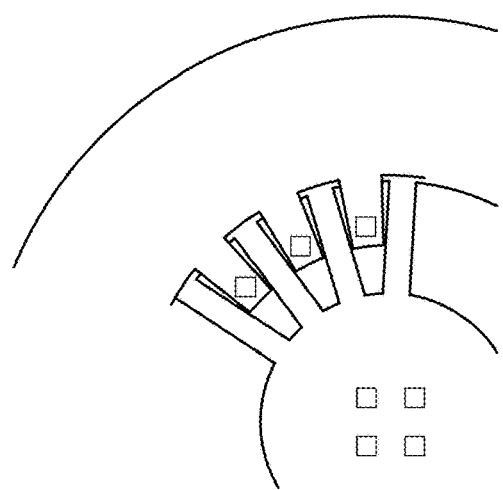
FIG. 11B
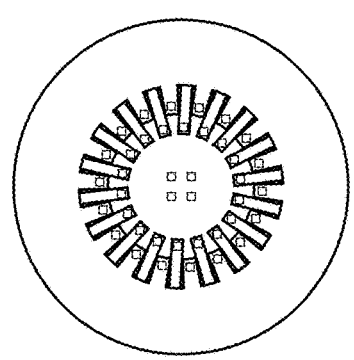
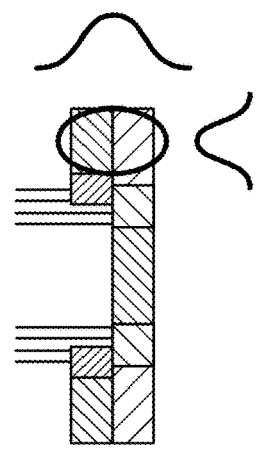
FIG. 11A

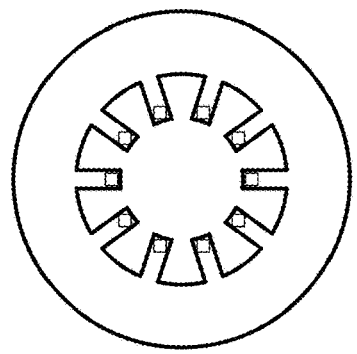
FIG. 12D
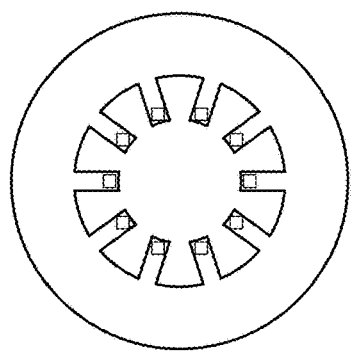
FIG. 12C
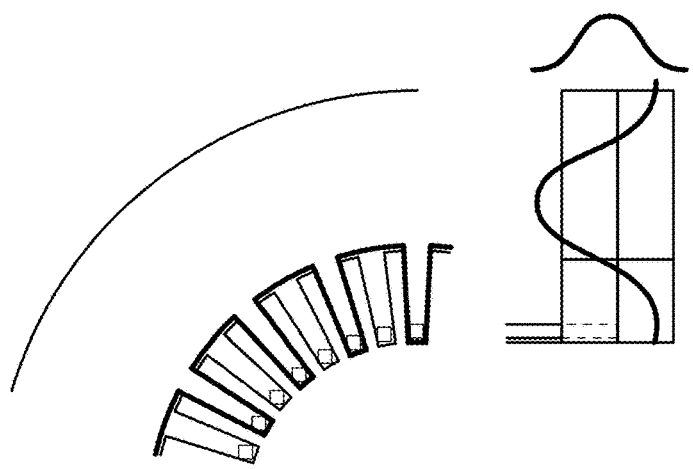
FIG. 12B
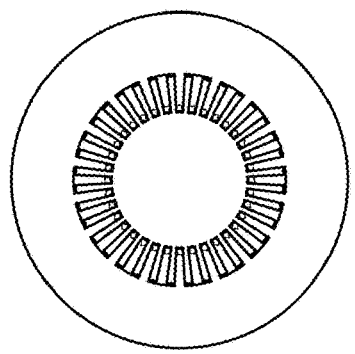
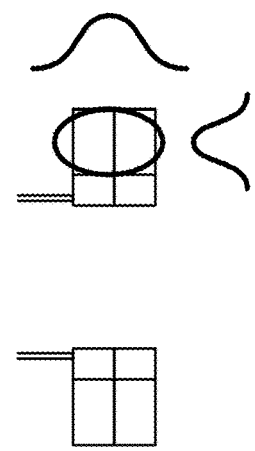
FIG. 12A

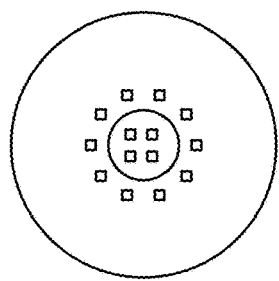
FIG. 14D
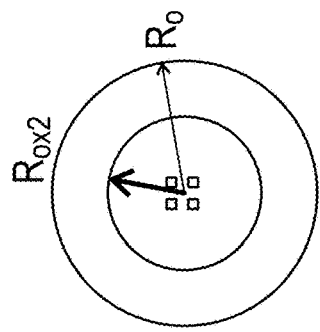
FIG. 14C
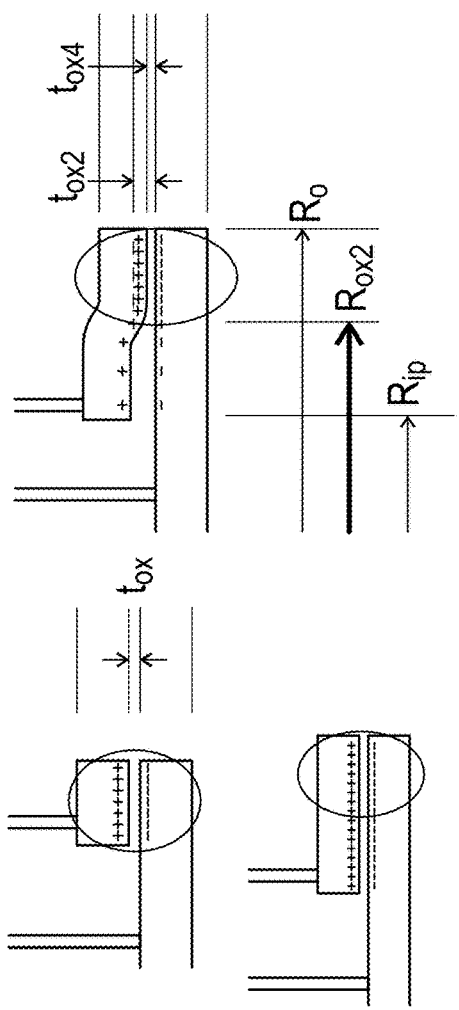
FIG. 14B
FIG. 14A
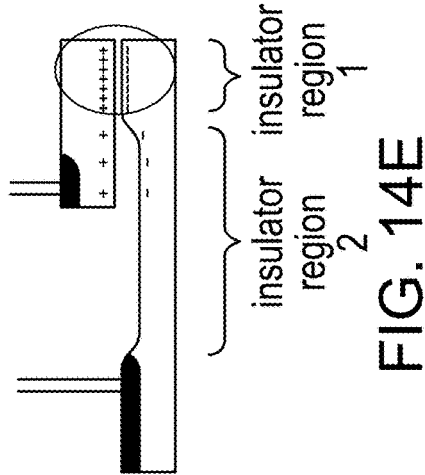
FIG. 14E

MOSCAP RING RESONATOR OPTICAL MODULATOR

RELATED APPLICATIONS

This application is related to and claims the benefit of U.S. Provisional Application No. 63/130,986, filed on Dec. 28, 2020, the entire contents of which are incorporated herein by reference.

BACKGROUND

1. Technical Field

The present disclosure is related to microring resonator modulators (MRM) in integrated photonics and, in particular, to a MRM with a built-in metal-oxide-semiconductor (MOS) capacitor, the MRM having a small radius and increased free spectral range (FSR), and reduced loss, power consumption, and interference with other wavelength channels, i.e., adjacent channel crosstalk.

2. Discussion of Related Art

Microring resonator modulators (MRM) are on-chip devices used for converting signals from the electrical to the optical domain for processing or transmission in this domain. MRMs commonly use a built-in p-n junction diode or metal-oxide-semiconductor (MOS) capacitor (MOSCAP) as an electro-optic phase shifter. An important characteristic of MRMs is energy consumption, which depends on capacitance density in the electro-optic phase shifter, the size, i.e., radius, of the microring resonator, and optical propagation losses. The higher the capacitance density and the smaller the radius and optical losses are, the more efficient the modulator is. Because of their very thin insulator layer, MOSCAP-based phase shifters provide very high capacitance density compared to more traditional phase shifters based on carrier depletion modulation or injection in p-n diodes. However, the geometry of existing MOSCAP phase shifters is such that building very small MRMs using these phase shifters would result in high optical propagation losses due to excessive radiation or absorption loss of the optical mode. Therefore, the size of the existing MOSCAP MRMs is currently greater than 10 µm in radius.

SUMMARY

According to one aspect, a ring resonator optical modulator is provided. The ring resonator optical modulator comprises: (i) a ring-shaped optical region in which optical radiation can propagate in a circular path, the ring-shaped optical region having an inner radius and an outer radius, the outer radius being coincident with an outer perimeter of the ring resonator (optical modulator); (ii) a ring-shaped metal-oxide-semiconductor (MOS) capacitor structure having an upper gate device layer of the MOS capacitor structure and a lower body device layer of the MOS capacitor structure, and an insulating material being disposed between the upper gate device layer of the MOS capacitor structure and the lower body device layer of the MOS capacitor structure; and (iii) a cladding region comprising cladding material of lower refractive index than the refracting index of the upper gate device layer or the lower body device layer disposed radially outwardly from the outer perimeter of the ring-shaped optical region. The optical radiation is confined within the optical region, along the radial direction toward the inner side of the outer perimeter of the ring-shaped optical region, due to refractive index contrast between the ring-shaped optical region and the cladding region/cladding material. The insulating material has a first region and a second region having a respective first thickness and second thickness, the second thickness being greater than the first thickness, the first region being disposed in the ring-shaped optical region, the second region being disposed radially inwardly from the inner radius of the ring-shaped optical region, such that the optical radiation is radially confined toward the outer side of the inner radius of the optical region within the ring-shaped optical region due to refractive index contrast between the ring-shaped optical region and the second region of insulating material.

According to another aspect, a ring resonator optical modulator is provided. The ring resonator optical modulator comprises: a ring-shaped optical region in which optical radiation can propagate in a circular path, the optical region having an inner radius and an outer radius, the outer radius being coincident with an outer perimeter of the ring resonator optical modulator; (ii) a ring-shaped metal-oxide-semiconductor (MOS) capacitor structure having an upper gate layer of the MOS capacitor structure and a lower body layer of the MOS capacitor structure; (iii) an insulating material being disposed between the upper gate layer of the MOS capacitor structure and the lower body layer of the MOS capacitor structure; and (iv) a cladding region comprising cladding material of lower refractive index than the refracting index of the upper gate device layer or the lower body device layer disposed radially outwardly from the outer perimeter of the ring-shaped optical region. The optical radiation is radially confined at the outer perimeter of the ring-shaped optical region within the optical region due to refractive index contrast between the ring-shaped optical region and the cladding material. a first electrode electrically coupled to the upper gate layer of the MOS capacitor structure and a second electrode electrically coupled to the lower body layer of the MOS capacitor structure, the first and second electrodes being radially disposed radially inwardly from the inner radius of the optical region.

According to another aspect, a resonant electro-optic modulator is provided. The resonant electro-optic modulator comprises a closed-loop optical resonator supporting a guided-wave mode of confined optical radiation, the optical radiation mode's guidance being provided—in a cross-section of the closed-loop optical resonator—by refractive index confinement, the cross-section having a radially inward and a radially outward side with respect to the closed-loop optical resonator structure. The optical resonator includes a first semiconducting material device layer (body) having a first radially outward boundary and a second semiconducting material device layer (gate) having a second radially outward boundary, the first and second semiconducting material device layers each being doped to conduct electric charge carriers, and separated by an insulating material to form a metal-oxide-semiconductor (MOS) structure. The insulating material comprises a first region having a first thickness and a second region having a second thickness larger than the first thickness and disposed adjacent the first region forming a boundary between the first and second regions of the insulating material. The first region of insulating material is disposed against the first radially outward boundary along the circumference of the structure, and the second region of insulating material is disposed radially inward from, and abutting, the first region of insulating material, such that the guided-wave mode of optical radiation is confined by refractive index confinement between the first and/or second radially outward boundary on the radially outward side (of the mode of optical radiation), and the boundary between the first and second regions of the insulating material on the radially inner side (of the mode of optical radiation). The closed-loop optical resonator further comprises a first conducting electrode electrically connected to the first semiconducting material device layer, and a second conducting electrode electrically connected to the second semiconducting material device layer, such that application of a voltage across the first and second electrodes effects motion of charge into and/or out of the capacitor formed by the first semiconducting device layer, the first region of insulating material and the second semiconducting layer, and changes the effective refractive index seen by the mode of optical radiation.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 1A includes a schematic perspective view of a microring resonator modulator (MRM) with integrated MOSCAP phase shifter, according to some exemplary embodiments.

FIG. 1B includes a schematic cross-sectional view of the MRM with integrated MOSCAP phase shifter of FIG. 1A, according to some exemplary embodiments.

FIG. 1C includes a schematic cross-sectional view of the MRM with integrated MOSCAP phase shifter of FIG. 1A, illustrating the distribution of the radial component of the electric field of the optical mode, showing its overlap with the integrated MOSCAP structure, according to some exemplary embodiments.

FIG. 1D includes a schematic detailed cross-sectional view of the MRM with integrated MOSCAP phase shifter of FIG. 1A illustrating the material structure and doping profile in the phase shifter, according to some exemplary embodiments.

FIGS. 2A and 2B illustrate simulated curves of capacitance density (fF/$\mu m^2$) and resonance frequency shift (GHz), respectively, of the integrated MOSCAP versus gate-body voltage, according to some exemplary embodiments.

FIGS. 3A through 3D illustrate a computer-aided design (CAD) mask layout of a MOSCAP MRM structure suitable for implementation for a CMOS electronic-photonic chip/wafer fabrication process, according to some exemplary embodiments.

FIGS. 4A through 4C illustrate a CAD mask layout of a MOSCAP MRM structure suitable for implementation for a CMOS electronic-photonic chip/wafer fabrication process, with a 2.0 $\mu m$ radius, according to some exemplary embodiments.

FIGS. 9A through 9D illustrate the schematic perspective and cross-sectional views MOSCAP structure with sub-wavelength segmentation of the gate.

FIGS. 10A through 10D illustrate another embodiment of a MOSCAP MRM, where multiple interface dielectric thicknesses may not be available, according to some exemplary embodiments.

FIGS. 11A through 11D illustrate another embodiment of a MOSCAP MRM of FIGS. 10 A-D, where the sub-wavelength segments are merged together at the center of the ring creating a disk where the metal vias forming contact to the body are placed, according to some exemplary embodiments.

FIGS. 12A through 12D illustrate a slightly different implementation of the embodiment of FIGS. 10A-10D and FIGS. 11A-11D, according to some exemplary embodiments.

FIGS. 14A through 14E illustrate various embodiments utilizing design of variable gate oxide geometry and thickness profile to improve optical and electrical efficiency of ring modulators.

DETAILED DESCRIPTION

Figure 5:
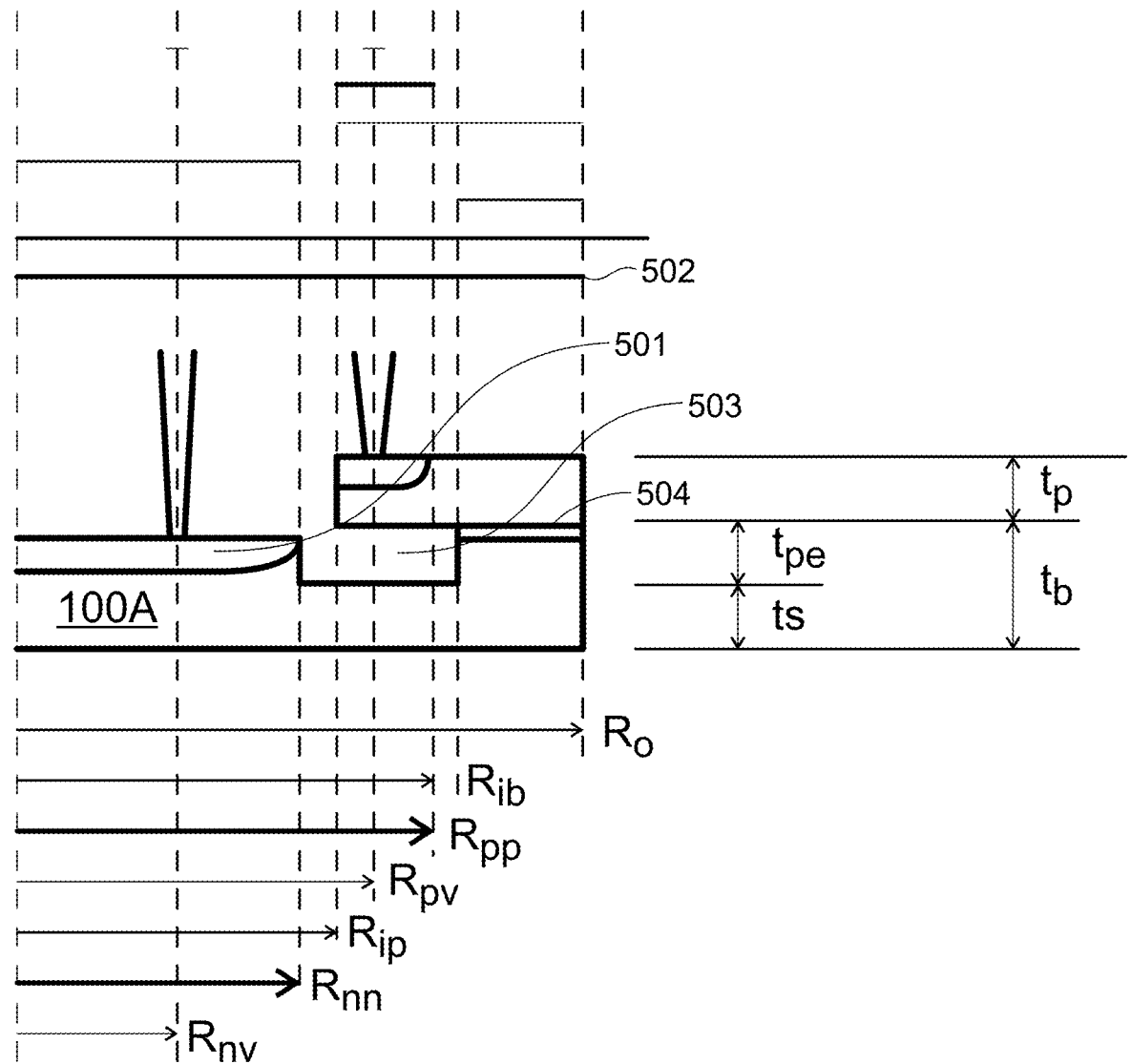
FIG. 5 illustrates a schematic cross-sectional view of a MOSCAP MRM, according to some exemplary embodiments.

According to the technology of the present disclosure, two novel structures are implemented in a MRM with built-in MOSCAP. In particular, two novel cross-sectional geometries are implemented according to the present disclosure.

In a first structural geometry, metal contacts and conductive semiconductor electrodes used for supplying drive voltage to the capacitor plates are located radially inward from the outer radius of the ring, that is, radially toward the center of the ring. This provides for creation of the highest possible effective index-of-refraction contrast for a given material platform at the outer radius of the ring, where the optical mode is confined. In certain exemplary embodiments, this is because the silicon layer can be fully etched through at the outer radius, maximizing effective index contrast, since both electrical terminals are at the inner radius side of the optical mode. High effective index contrast reduces radiative losses of the optical mode at a given bend radius, and consequently allows smaller radius of the MRM for a given acceptable radiation loss.

In a second structural geometry, the insulating material, e.g., silicon dioxide ($SiO_2$), between the capacitor plates or layers, i.e., the upper gate layer and the lower body layer, includes at least two regions of at least two different thicknesses. A thinner layer is used in the radially outward region where the optical mode has the highest intensity, providing high modulation efficiency. A thicker layer is used radially inward where the optical mode is weak and therefore practically does not negatively affect the modulation efficiency. However, the thicker insulator pushes the tail of the optical made away from the center of the resonator where the metal contacts are placed, toward the outer rim, circumference or perimeter of the resonator. This reduces optical absorption by metal contacts, which allows further reduction of the modulator radius without incurring high losses due to metal absorption. It also better confines the optical mode to the region with thin insulating material, where the majority of the modulation occurs, thus increasing the overlap of the optical mode with the modulation region and increasing modulation efficiency.

In addition to the above energy considerations, the technology of the present disclosure provides other important advantages. For example, the smaller device radius allows for larger free spectral range (FSR), i.e., difference in frequency between adjacent resonances, in the device. Modulators with large FSR if used in wavelength-division-multiplexed (WDM) optical communication links can accommodate a large number of wavelength channels, therefore increasing the total bandwidth of the link. The smaller device radius also results in smaller total device capacitance and, therefore, lower $$\frac{1}{2}CV^2$$

energy consumption of the device per unit time (e.g. bit length), measured in joules (e.g. joules per bit, J/b), where C is the capacitance and V is the applied voltage. Also, the modulation depth m provided by the device, in which the modulated optical power output is $P=P_0[1+m \cos(2\pi f_m t)]/2$ (P is the modulated optical signal, $P_0$ is the input optical power, $f_m$ is the modulation frequency and m is the modulation depth), depends on the capacitance per unit length along the ring circumference and the applied voltage, but does not depend on the total capacitance. Therefore, the smaller device of the present disclosure exhibits the same modulation depth m as larger devices, but consumes less energy. Also, the smaller device naturally has a smaller physical footprint, and, since photonic devices and electronic devices such as transistors share the same silicon area, but the photonic devices are hundreds of times larger than electronic devices, a reduction in size of a photonic device can be very helpful in reducing overall system footprint on chip.

The different thicknesses of the insulating layer also provide certain advantages. For example, because the optical mode propagates closer to the outer radius of the modulator, only the portion of the capacitance that is closer to the outer radius contributes to the modulation depth. On the other hand, the capacitance toward the center of the modulator resonator ring (away from the optical mode) does not contribute to modulation depth m, but it does contribute to energy consumption of the device. Therefore, by using thicker oxide away from the optical mode (toward the center of the resonator ring), the energy consumption can be reduced by essentially removing or reducing parasitic capacitance in total C in $$\frac{1}{2}CV^2,$$

i.e., without sacrificing the modulation depth. Also, thicker oxide in the center can help ensure that only the fundamental mode in the cross-section of the modulator is excited. Excitation of higher-order modes, which happens in conventional disk-shaped resonators, can cause losses and produce unwanted spectral features in the transmission spectrum and interference, which can reduce signal quality. The technology of the present disclosure eliminates this issue. Because the thicker oxide in the center or radially inward region confines the fundamental optical mode on/toward the outer rim of the modulator resonator ring, metal contacts can be closer to the optical mode without inducing high propagation losses. This allows further reduction in size compared to a configuration in which only thinner oxide is used.

According to the technology of the present disclosure, an improved MRM with reduced device radius is provided, the device exhibiting greatly improved performance characteristics. In some exemplary embodiments, the radius of the device is in a range of 1.3 to 5.0 µm and is nominally 1.5 µm. Operating freespace wavelength of the provided examples is in the O-band (1260-1360 nm) or SCL bands (1495-1640 nm) wavelength ranges; other exemplary implementations may also extend from 1160 nm wavelength to 1700 nm. Operating wavelength $\lambda_o$ will, per usual convention, generally be taken to refer to a particular frequency of light, $f_o$ ($f_o=c/\lambda_o$), where c is the speed of light, c=299,792,458 m/s), rather than physical wavelength in the medium of propagation. Device designs may have radii as short as 0.8 to 1 um. The free spectral range (FSR) of the device is in the range of 2 to 10-15 THz and is nominally 8.5 THz, with no substantial higher-order resonance response present in the spectrum. The device, in one embodiment, exhibits 30 GHz/V resonance shift efficiency over a range of several Volts for bias voltage, which is the largest among conventional silicon microring modulators.

FIG. 1A includes a schematic perspective view of a microring resonator modulator (MRM) 100 with integrated MOSCAP phase shifter, according to some exemplary embodiments. FIG. 1B includes a schematic cross-sectional view of the MRM with integrated MOSCAP phase shifter of FIG. 1A, according to some exemplary embodiments. FIG. 1C includes a schematic cross-sectional view of the MRM with integrated MOSCAP phase shifter of FIG. 1A, illustrating the distribution of the radial component of the electric field of the optical mode, showing its overlap with the integrated MOSCAP structure, according to some exemplary embodiments. FIG. 1D includes a schematic detailed cross-sectional view of the MRM with integrated MOSCAP phase shifter of FIG. 1A illustrating the material structure and doping profile in the phase shifter, according to some exemplary embodiments.

Referring to FIGS. 1A-1D, MRM 100 is coupled to an optical bus waveguide 102, which acts as an input/output port of MRM 100, to apply modulation to the optical radiation propagating through optical bus waveguide 102. MRM 100 of the exemplary embodiments includes an upper gate layer 104 and a lower body layer 106 surrounded by an insulating material 112, which can be $SiO_2$. Upper gate layer 104 can include a region 104B which serves as the gate of the MOSCAP and a region 104A, which can be used as an electrode to which metal via contact 110 can be connected. Similarly, lower body layer 106 can include a region 106B which serves as the body of the MOSCAP and a region 106A, which can be used as electrode to which metal via contact 108 can be connected. In some exemplary embodiments, region 104B can be lightly doped n-type silicon, and region 104A can be heavily doped n+-type silicon. In some exemplary embodiments, region 106B can be lightly doped p⁻-type silicon, and region 106A can be heavily doped p⁺-type silicon. As shown in FIG. 1A in particular, metal via contacts 108, 110 are disposed in rings about the center of MRM device 100, with one set of metal via contacts 108 contacting a lower MOSCAP device layer (lower body layer) 106, and one set of metal via contacts 110 contacting the other MOSCAP device layer (upper gate layer) 104. In some embodiments, not shown in FIG. 1, the body and gate layers could be patterned into fingers extending out toward the contacts, thus forming a series of axial "spokes" connecting some or all of the metal via contacts 108, 110 and the optically active region 120 of the device 100. Such contacts are illustrated in, for example, FIGS. 9 to 12.

An annular ring-shaped optical region 120, in which the optical radiation of the MRM 100 propagates, is located next to and bound on its outer radial extent by the outer radius of the structure 100. The upper gate device layer 104 of the MOSCAP is spaced apart from the lower body layer 106 by insulating material 112 which may comprise one or more material layers. The insulating material 112 which separated the gate device layer and the body layer 106 includes at least two regions. The first (optically active) region 122 is of a first thickness, which can be, for example, 0.5-20 nm, and forms the dielectric of the MOSCAP between the gate 104 and body 106 device layers of the MOSCAP. In certain embodiments, a second region 124 is of a second thickness, which is greater than the first thickness and can be, for example, 3-200 nm. In other embodiments, the second region 124 may be of the same thickness as the first region 122. A third region of insulating material 126 may surround, protect and isolate the device 100 from other devices and the environment. The third region 126 may, in general, comprise one or more materials, but generally comprises materials that, where they are in contact with the body 106 or gate 104 layers, are lower than them in refractive index. The first and second regions 122, 124 define the inner and outer radii of optical region 120. The inner radius of the optical region 120 may be at the boundary of the first region of the insulating material 122 and the second region of the insulating material 124. The outer radius of the optical region may be at the outer radius of the first region 122, or of the gate device layer 104 or of the body device layer 106.

According to the present technology, a mirroring resonator modulator with built-in MOSCAP phase shifter is provided. The "MOS" nomenclature notwithstanding, according to exemplary embodiments, both the gate layer 104 and body layer 106, i.e., "M" and "S" layers are optically transparent in the 1.3 or 1.5 µm range for data communication applications, and more broadly in the 1.1 to 1.7 µm range. Thus, in device 100 of the present disclosure, the metal ("M") is a semiconductor material, which in some exemplary embodiments is polycrystalline silicon. Similarly, in some exemplary embodiments, the semiconductor ("S") is a second semiconductor, for example monocrystalline or crystalline silicon. The "O" or oxide is a suitable electrical insulator, which, as noted above, can be SiO₂. Such structures can also be referred to as semiconductor-insulator-semiconductor (SIS) structures. In some CMOS-process-compatible embodiments, the microring structure 100 includes a bottom semiconductor 106 (transistor body silicon) and top semiconductor 104 (gate polysilicon) layers, which act as (optically transparent) capacitor plates and are separated by an insulating layer 122 (gate oxide). Use of a CMOS process is particularly advantageous because it has been optimized for high capacitance density and low leakage across the insulator, for realizing transistors.

According to exemplary embodiments, the inner radius of the gate ring is larger than an inner radius of the body structure. In some exemplary embodiments, the body may be a disk, i.e., not have an inner radius, in which case the inner radius is considered to be zero. Metal contacts 108, 110 are placed closer to the inner radii of both body 106 and gate 104 layers and the center of the structure than to the optical region 120, that is, the region 120 where the optical mode resides. At the outer radius, in certain exemplary embodiments, both the body 106 and gate 104 are fully etched, creating an effective high-index-contrast barrier for the optical mode that propagates along the perimeter of MRM 100. The outer radii of the body 106 and gate 104 may or may not coincide. Insulating layer 122, 124 between body 106 and gate 104 can be of uniform thickness or can be thicker in the center and thinner at the outer rim of MRM 100, as shown. A thick insulating layer can be created either by partially etching the body 106 in the region radially inward from the optical mode region 120, and filling it with insulating material, or by deposition of insulating material on body 106, and patterning it to only have a larger thickness in the region radially inward from optical region 120. In particularly efficient embodiments, the inner radius of the upper semiconductor layer 104, i.e., the poly gate 104, is radially closer to the center, i.e., further radially inward, than the boundary of thick 124 (radially inward) and thin 122 (radially outward) insulating layer regions, which creates an inner optical confinement barrier via index contrast for the optical mode. This importantly allows the upper poly gate 104 to be electrically contacted in a region radially inward from the optical mode, without causing optical loss, with the separation produced by the thicker insulating layer 124. The technology of the disclosure applies to any semiconductor MOS-like structure, not only silicon, including III-V device layers, as well as hybrid III-V-silicon structures where one device layer may be III-V and the other silicon.

In the microring resonator electro-optic modulator 100 including integrated MOSCAP structure of the present disclosure, the capacitor plates, i.e., gate layer 104 and body layer 106, can be made of different materials, or made of the same material, such as silicon. In the exemplary illustration of FIG. 1, the body 106 and gate 104 have different dopant types (p-type and n-type, or n-type and p-type, respectively). On the outer rim of the resonator, where the optical mode is guided in region 120, the body 106 and gate 104 layers are separated by insulator region 122, having a small thickness, in this case several nanometers. High capacitance density due to the thin insulator layer in the region 120 where the optical mode is strongest provides high modulation efficiency. The body 106 is partially etched radially inwardly, and the etched height is filled with insulator in insulator region 124. The resulting relatively thick insulator layer region 124, having a thickness of tens of nanometers, performs at least two functions: (i) it reduces the capacitance density in the regions where the optical mode has low intensity, thereby reducing the parasitic capacitance of the device, and (ii) it prevents excitation of higher-order modes due to higher index contrast between the body material and the insulator and allows placement of metal vias 108, 110 closer to the outer radius of the resonator for lower resistance by confining the desired optical mode more tightly on the outer rim of the resonator. Metal vias 108, 110 are placed radially inward on body 106 and gate 104.

In certain embodiments of the MOSCAP MRM, the body 106 device layer may be doped n type and the gate 104 device layer p-type, in which case the gate 104 must be biased positively with respect to the body voltage to operate the MOSCAP MRM in the accumulation regime. In other embodiments, the body 106 device layer may be doped p-type and the gate 104 device layer may be doped p-type, in which case the gate voltage must be negative with respect to the body voltage to operate the MOSCAP MRM in the accumulation regime.

FIGS. 2A and 2B illustrate simulated curves of capacitance density (fF/$\mu m^2$) and resonance frequency shift (GHz), respectively, of the integrated MOSCAP versus gate-body voltage $V_{gb}$ (Volts), i.e., $V_{gb}=V_g-V_b$, with $V_g$ being the gate voltage and $V_b$ being the body voltage, for different thicknesses of the insulating material, e.g., silicon dioxide, in region 122, according to some exemplary embodiments. Specifically, the two exemplary oxide thicknesses illustrated in the curves are 2 nm and 4 nm and the material silicon dioxide. In FIG. 2A the capacitance density increases as the MOSCAP structure shifts from the depletion regime (on the right) to accumulation regime (on the left) with the increase of gate-body voltage $V_{gb}$ magnitude from 0 to 3V, and reaches its maximum in complete accumulation regime. In FIG. 2B optical resonance frequency shift, proportional to the capacitance density, first increases slowly at lower voltages due to the low capacitance density of the MOSCAP in the depletion regime, then reaches its maximum rate of change, i.e. sensitivity (represented by the slope of the linear section) as the capacitance density approaches its maximum.

FIGS. 3A through 3D illustrate a computer-aided design (CAD) mask layout of a MOSCAP MRM structure suitable for implementation for a CMOS electronic-photonic chip/ wafer fabrication process, according to some exemplary embodiments. FIG. 3A illustrates the layout of the MOSCAP MRM with 1.5 µm radius detailing all foundry mask layers required for producing the MRM in the fabrication process. FIG. 3B shows additional mask layers of metal wiring that connect the MRM to contact pads on the surface of the chip which enable testing of a standalone MRM prior to integration into larger scale systems. FIG. 3C shows only the mask layer required for creating the body 106 of the MOSCAP MRM with partial etch on the inner radius of the optical region 120 and the bus waveguide 102, and the layers required for creating desired doping profile in the body. Similarly, FIG. 3D shows only the mask layers needed for creating the gate 104 and producing desired doping profile in the gate.

FIGS. 4A through 4C illustrate a CAD mask layout of a MOSCAP MRM structure suitable for implementation for a CMOS electronic-photonic chip/wafer fabrication process, with a 2.0 µm radius, according to some exemplary embodiments.

FIG. 5 illustrates a schematic cross-sectional view of a MOSCAP MRM 100A according to some exemplary embodiments. The schematic shows some key radial dimensions which correspond to the inner and outer radii of exemplary mask design layers that may be used to form the physical structure of the MRM 100A in a semiconductor foundry process, such as the body full and partial etch, gate definition, metal vias, as well as of mask layers that produce the desired doping profile in the body 106 and gate 104. In this embodiment, Rnv is the radial position of the n-doped side (here the bottom device layer) vias; Rnn is the outer radius of the pedestal supporting the n-doped side vias, as well as of a highly doped (n++) region (in this example they coincide); Rip is the inner radius of the p-doped side of the structure (here, the top device layer); Rpv is the radial position of the p-doped side (here, the top device layer) vias; Rpp is the outer radius of a highly p doped region (p++) connected to the p side vias; Rib is the inner radius of the optical guiding region's partial etch in the bottom device layer; and Ro is the outer radius of, in this case, both the top and bottom device layers; tp is the thickness of the top device layer, tb is the thickness of the bottom device layer, tpe is the depth of the partial etch in the bottom device layer, and is is the remaining slab thickness in the partial etched regions of the bottom device layer.

In certain fabrication processes it may be advantageous, or required by design rules, to form vias on the top of the device layer. The pedestal of radius Rnn provides top of device layer via contact, while being sufficiently radially inward from the optical mode to avoid overlap with the optical field. In some embodiments the via is adjacent to a higher doped (n++) region 501 to reduce resistance. In this example (FIG. 5) the outer radius of the pedestal and the n++ region coincide. The n++ region is sufficiently radially inward so that it does not overlap with the optical field and thus does not cause optical losses.

Without loss of generality, tpe >0 (in FIG. 5) could also be produced by oxidation of the bottom device layer, with a process such as that used for transistor gate oxide formation in silicon field effect transistors. Hence, in context of our structure partial etch or oxidation are to be understood as interchangeable, as well as any other process for producing a thicker insulator between the device layers in that region.

In certain embodiments, the standard masks of CMOS processes designed to realize high voltage field effect transistors (thicker gate) and logic transistors (thinner gate) are utilized to realize the thick and thin insulators between the device layers in FIG. 5. In other processes, such as silicon photonics processes, the different insulators can be formed by explicit timed partial etch steps, or a combination of partial etch and oxidation.

The lines at the top of FIG. 5 illustrate exemplary masks to generate the structure, and an example ordering from bottom to top. For example, the bottom mask 502 is the full etch mask forming the ring/disk shape in the bottom silicon device layer.

In certain embodiments, the inner radius of the top layer, Rip, the associated vias at Rpv, and/or the highly doped region(s) adjacent those vias which extend radially to Rpp, may be radially inward from the inner radius of the guiding region, Rib, in order to minimize overlap of optically lossy vias and high doped regions with the optical mode.

In certain embodiments, presence of the partial etch 503 allows confinement of the optical mode primarily above a certain inner radius, Rib. This is useful to keep a resonator single mode at larger radii. At small radii, a disk-like resonator can still confine the optical mode primarily against the outer wall, just by the outer boundary, without need for an inner partial etch. However, higher order modes will still be present, and have required e.g. curved bus waveguides to be used, which is not advantageous to use in all situations, or possible in certain configurations.

The gate oxide 504 in the optical region and the insulator 503 outside the optical region may be formed using the same or different processes. The gate oxide 504 is typically thin, and formed by a process similar to gate oxide formation for transistors. The insulator 503 could be formed by a partial etch, gate oxide formation, etc. The material may be silicon dioxide, or another insulator.

Figure 6:
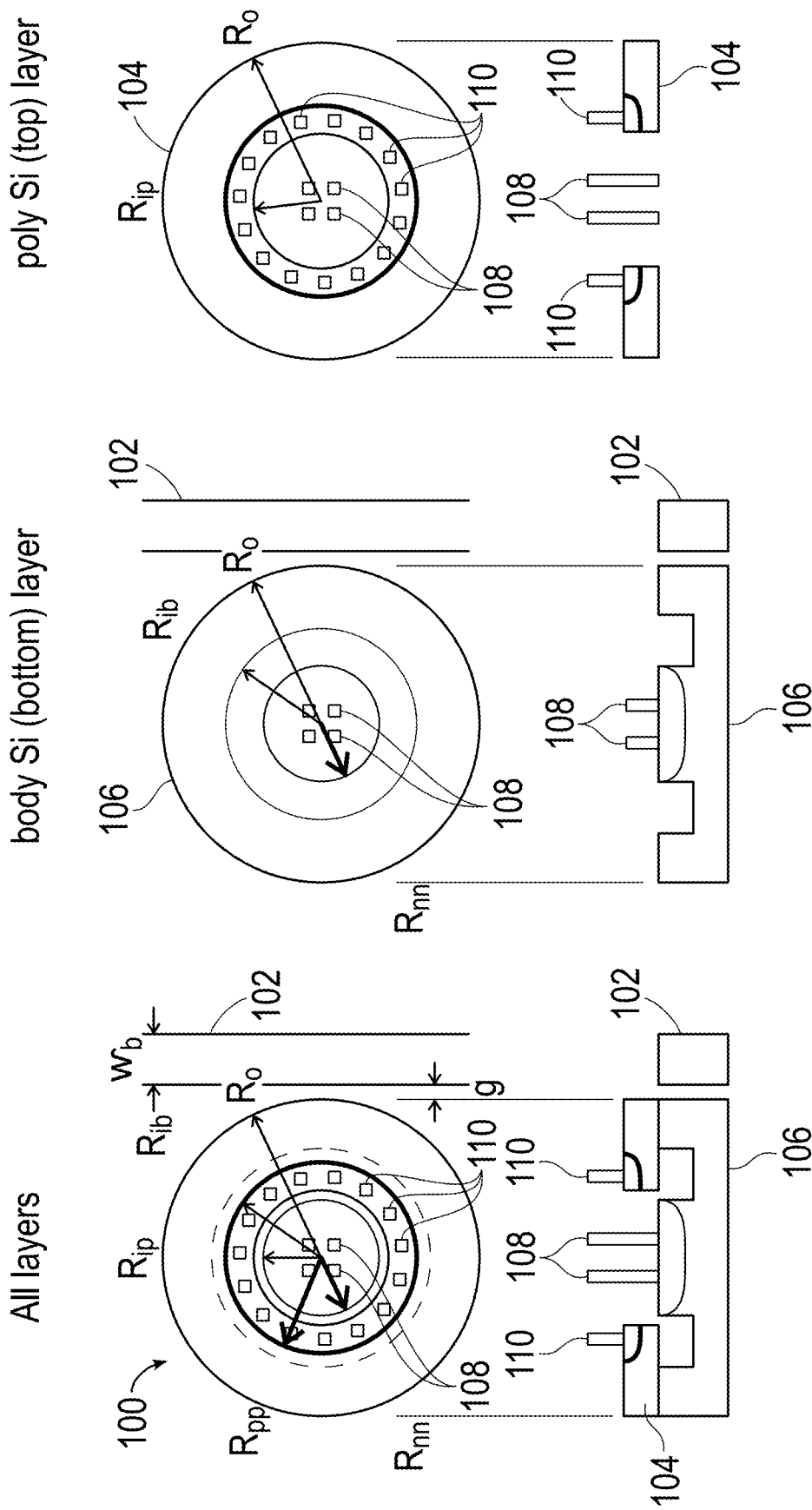
FIGS. 6A through 6C include schematic top views and cross-sectional views corresponding to the cross-section of FIG. 5 as an exemplary embodiment of the MOSCAP MRM of FIG. 5, according to some exemplary embodiments.

FIGS. 6A through 6C include schematic top views and cross-sectional views corresponding to the cross-section of FIG. 5 as an exemplary embodiment of the MOSCAP MRM 100A of FIG. 5, according to some exemplary embodiments. Specifically, FIG. 6A includes schematic top and cross-sectional views of MRM 100A. FIG. 6B includes schematic top and cross-sectional views of lower body layer 106 of MRM 100A. FIG. 6C includes schematic top and cross-sectional views of upper gate layer 104 of MRM 100A. As illustrated in FIGS. 6A and 6B, bus waveguide 102 can be formed on body layer 106. In other embodiments, the waveguide could be formed in the gate layer, or in both, i.e., a sandwich of the gate and body layer. Since the top device layer, the gate layer, is often a polycrystalline semiconductor with higher optical propagation loss than the lower, body device layer, often forming the bus waveguide in the bottom device layer only may be preferable to minimize optical loss. As also shown in FIGS. 6A-6C, metal via contacts 108 are formed to contact body layer 106, and metal via contacts 110 are formed to contact gate layer 104. In this exemplary embodiment, the bottom layer is a crystalline silicon device layer, for example of a silicon CMOS process; and the top layer is a polycrystalline silicon device layer, for example of a silicon CMOS process. The various radial dimensions of FIG. 5 are correspondingly shown in top view in this figure.

Figure 7:
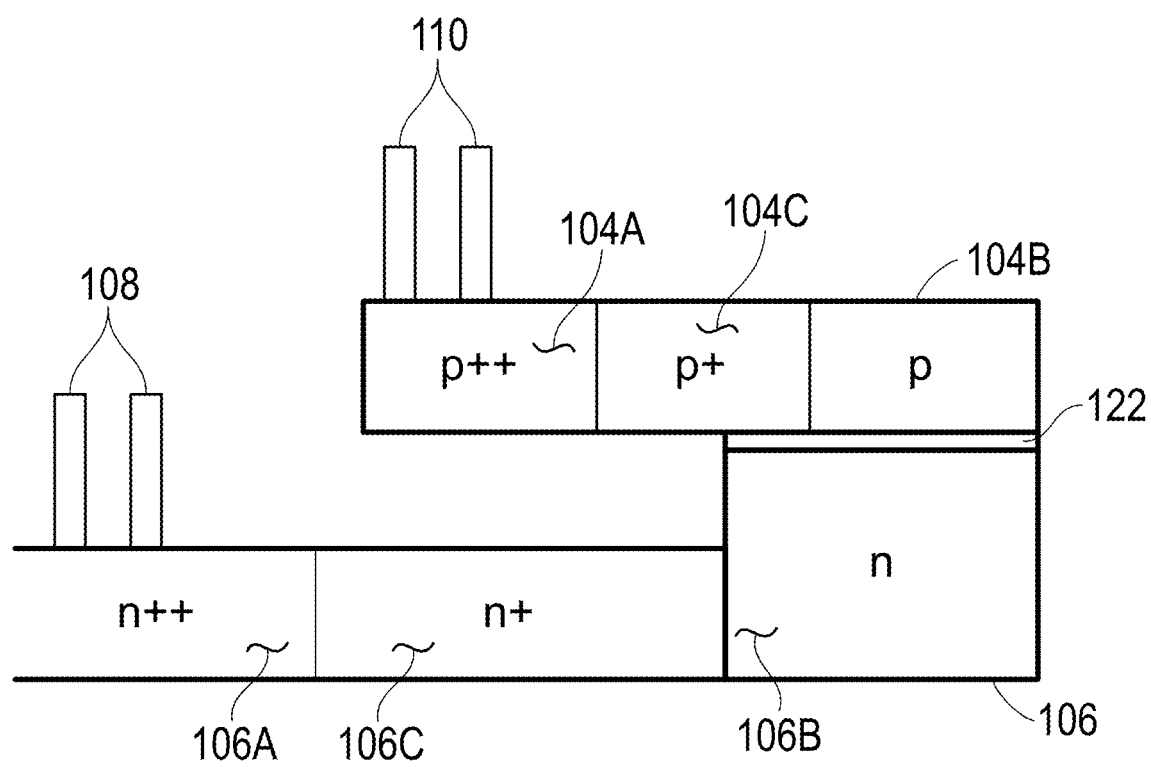
FIG. 7 includes a partial detailed schematic cross-sectional view of a portion of an MRM, illustrating an exemplary doping profile (different than that illustrated in FIG. 1D) of the gate layer and the body layer, according to some exemplary embodiments.

FIG. 7 includes a partial detailed schematic cross-sectional view of a portion of MRM 100, illustrating an exemplary doping profile (different than that illustrated in FIG. 1D) of gate layer 104 and body layer 106, according to some exemplary embodiments. As illustrated, under metal via contacts 110, 108 in regions 104A and 106A, body and gate semiconductors are heavily doped, e.g., $p^{++}$, $n^{++}$, respectively, in order to create good conductive contacts between the metal of vias 110, 108 and the semiconductor material of layers 104, 106, respectively. In this embodiment, intermediate conductive regions 104C, 106C are added that have high enough dopant concentrations, i.e., $p^+$ and $n^+$, respectively, to create low-resistance paths to the capacitor surrounding the insulator 122, but low enough to avoid adding excess loss to the optical mode, which has a tail extending into these regions. Finally, the capacitor plate regions 104B, 106B are lightly doped, i.e., p, n, respectively, for low optical loss (due to the large overlap of the optical mode with these regions) and sufficient conductivity.

FIGS. 8 to 12 illustrate multiple alternative exemplary embodiments suitable for implementation in an exemplary fabrication process where two different gate insulator thicknesses may not be available (either through partial etch, or multiple gate oxide thicknesses or a combination).

Figure 8A:
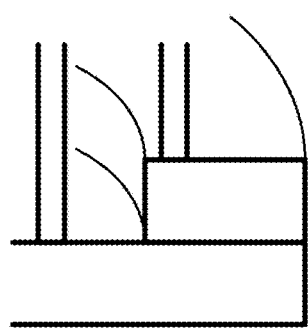
FIGS. 8A and 8B illustrate an exemplary MOSCAP MRM device where a dual-gate insulator is not available to confine the optical mode radially outward, but the ring cross-section is selected narrow enough to enforce single-mode-like operation (and to keep capacitance low).
Figure 8B:
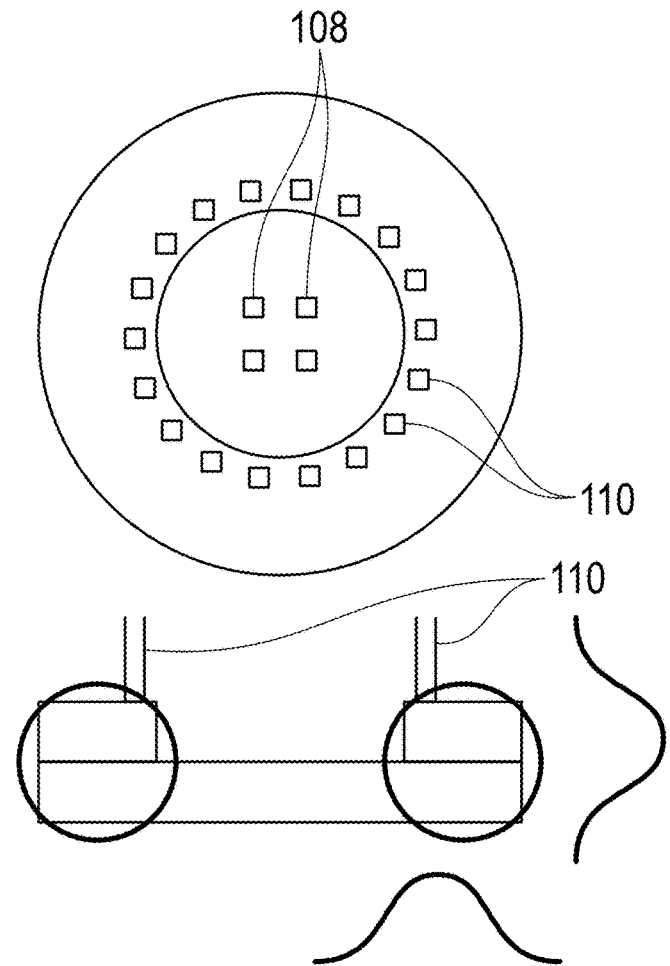

FIGS. 8A and 8B illustrate an exemplary MOSCAP MRM device where a dual-gate insulator is not available to confine the optical mode radially outward, but the ring cross-section is selected narrow enough to enforce single-mode-like operation (and to keep capacitance low). In this embodiment, the contact vias and highly doped regions surrounding them in the top device layer may have substantial overlap with the optical mode, and thus cause excessive optical losses and low Q. The embodiments of the invention disclosed herein address this problem.

Referring to FIG. 8A, if the manufacturing process does not allow a partial etch or dual thickness interface layers, the metal via contacts 108, 110 can be placed further away from the outer radius of the disk to prevent excess optical absorption by the contacts. For sufficiently small radii, the resonator operates optically like a whispering gallery, disk resonator, and the optical mode is nonetheless confined to the vicinity of the other radius. The smaller the radius, the narrower in horizontal dimension (tighter against the outer radius) the optical mode is. Therefore, for sufficiently small radii, the contacts can be recessed radially inward to reduce optical loss without changing the optical mode. However, higher order modes are present, albeit with lower Q, and this can produce unwanted spurious resonances in the spectrum. Hence, previous work with disk-like resonators has required a curved, "wrapped" bus waveguide to phase match to the used resonant mode and to avoid exciting these higher order modes.

If the manufacturing process does not allow partial etch, the effect of high index contrast on the inner radius of the optical region 120 can be achieved by using sub-wavelength segmentation of the gate device layer towards its inner radius. FIGS. 9A through 9D illustrate the schematic perspective and cross-sectional views MOSCAP structure with subwavelength segmentation of the gate. Between the inner radius of the gate and the inner radius of the optical region the gate is etched periodically in the azimuthal direction and the etched segments are filled with low-index cladding material such as silicon dioxide. The resulting periodic segments on the inner radius of the gate 104 with period sufficiently smaller than the optical wavelength act in the same way as an azimuthally invariant (not patterned) effective medium 901 (FIG. 9C) with an effective index that is some average of the refractive index in the interdigitated structure in FIG. 9B. The effective medium's effective refractive index is much smaller than the index of guiding core gate region 104, and thus can confine the optical mode as a cladding. This increased effective index contrast, similar to the case of partial etch of the body 106, pushes the optical mode toward the outer radius of the ring and allows placement of metal contacts closer to the outer radius of the ring.

FIGS. 10A through 10D illustrate another embodiment of a MOSCAP MRM, where multiple interface dielectric thicknesses may not be available, according to some exemplary embodiments. To create even stronger effective index confinement of the optical mode on the inner radius side, compared to the embodiment in FIG. 9A-D, subwavelength contacts can be implemented in the body device layer as well. Additionally, body and gate contacts can be azimuthally misaligned to lower the parasitic capacitance by ensuring that they do not form capacitors with a small gate oxide in the "access arm" sections, but only in the donut shaped main resonator part (optical region 1001) where the optical field is high. The contacts still have capacitance, but with a larger distance between them, and, hence, the capacitance and the amount of charge placed there is minimized.

FIGS. 11A through 11D illustrate another embodiment of a MOSCAP MRM of FIGS. 10 A-D, where the sub-wavelength segments are merged together at the center of the ring creating a disk where the metal vias forming contact to the body are placed, according to some exemplary embodiments. This is shown in FIG. 11C. Such arrangement of the body vias allows larger separation between the vias creating contacts to the body and gate reducing the parasitic capacitance and improving the energy efficiency and the speed of the MOSCAP MRM. It also may permit more vias to be instantiated, reducing resistance.

FIGS. 12A through 12D illustrate a slightly different implementation of the embodiment of FIGS. 10A-10D and FIGS. 11A-11D, according to some exemplary embodiments. This particular exemplary implementation of spokes permits closer spacing of the positive and negative electrodes, which enables control of the impedance of the transmission line formed by the positive contacts array and the negative contacts array.

Figure 13B:
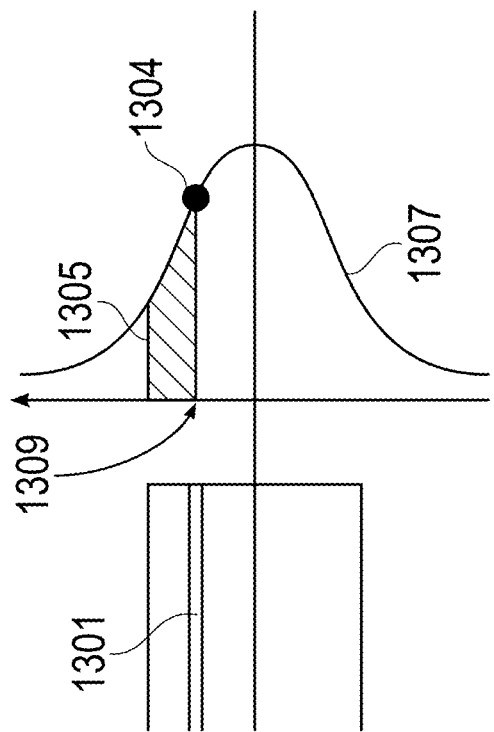
FIGS. 13A and 13B include schematic cross-sectional views of a portion of a MOSCAP MRM, according to some exemplary embodiments.
Figure 13A:
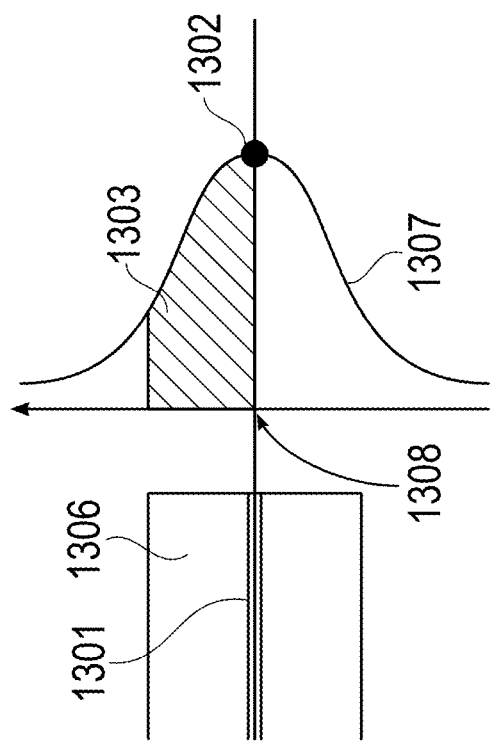

FIGS. 13A and 13B include schematic cross-sectional views of a portion of a MOSCAP MRM, according to some exemplary embodiments. FIGS. 13A and 13B illustrate vertical position of the gate oxide 1301 in the cross-section of the MOSCAP MRM according to some exemplary embodiments. Referring to FIGS. 13A and 13B, the vertical position of the gate oxide 1301 in the optical mode has an impact on the performance of the device. This means that the choice of body 106 (bottom) device layer thickness and gate 104 (top) device layer thickness provides a tradeoff. Assuming a constant sum of tbody+tpoly for a particular choice of waveguide design, e.g., single mode condition, we can trade off body thickness for gate thickness, i.e., increase one and decrease the other. If one layer is substantially more lossy (usually the gate, top layer), then instead of placing the gate oxide in the middle vertically (as illustrated in FIG. 13A), it may be optimal to place it higher. With the gate oxide in the middle 1308, it is in the peak 1302 of the optical field 1307 and provides maximum shift. However, a large portion 1303 of the upper half of the optical mode 1307 overlaps the lossy material 1306. As illustrated in FIG. 13B, placing the gate oxide 1301 at a higher position 1309 keeps the optical mode 1307 largely unchanged if the gate oxide 1301 is thin enough, but reduces considerably the mode overlap 1305 with the (optically lossy) gate layer 1301. The tradeoff is a substantial reduction in optical loss (good) for only a small reduction in the peak field 1304, i.e., a small reduction in shift efficiency (bad). This tradeoff will usually result in a higher ratio of shift efficiency normalized to intrinsic linewidth, i.e. ratio of shift efficiency to loss, which is a figure of merit for modulators for many applications.

FIGS. 14A through 14E illustrate various embodiments utilizing design of variable gate oxide geometry and thickness profile to improve optical and electrical efficiency of ring modulators. FIG. 14A includes a schematic cross-sectional view of a portion of a MOSCAP MRM with uniform thin gate oxide, according to some exemplary embodiments. In this embodiment, the inner radius of the gate device layer must be made small and the metal vias be placed further away (radially inward) from the optical region to prevent excess loss due to metal absorption (if there is substantial overlap with the optical mode). Due to small inner radius of the gate, there is a larger overlap between body and gate device layers and therefore the parasitic capacitance is larger. Parasitic capacitance is referred to as that portion of the capacitance that is closer to the inner radius of the gate where the optical intensity is low and thus placement of charge on that capacitance does not substantially contribute to optical modulation.

FIG. 14B includes a schematic cross-sectional view of a portion of a MOSCAP MRM, according to some exemplary embodiments. FIG. 14B illustrates an embodiment of the MOSCAP modulator of the disclosure, where the use of thick and thin oxides is combined to produce high capacitance density with thin oxide in the region where the optical mode is concentrated, and lower capacitance density with thick oxide in the regions where the optical mode has low intensity. This preserves the maximum capacitance density (shift efficiency), while minimizing the total capacitance) lowering energy, potentially increasing speed) by removing capacitance where there is little optical field. In this embodiment, the two oxides are formed on top of a body semiconductor device layer. Two thicknesses could be formed by masked oxidation, or by oxidation and masked etchback, or other techniques. In particular, CMOS processes support different gate oxide thicknesses, which are used in different types of field-effect transistors. Thicker gate oxide is used in transistors with higher threshold voltage. Thus, these embodiments could leverage existing features of electronics CMOS fabrication processes.

FIGS. 14C and 14D illustrate a schematic top view of the body and gate device layers, respectively, of the devices in FIGS. 14A and 14B, respectively, indicating the outer radial boundaries of the thin (Rox1, equal to the outer radius Ro of the body and gate device layers in this embodiment) and thick oxide (Rox2) layers.

FIG. 14E illustrates an alternate version of FIG. 14B, with oxidation growing oxide into silicon rather than etching silicon and filling back with oxide. In the embodiment of FIG. 14E, the lower body layer of the MOS capacitor is partially oxidized to a first depth to form the first region of the insulating material, and partially oxidized to a second depth to form the second region of the insulating material.

Figure 15B:
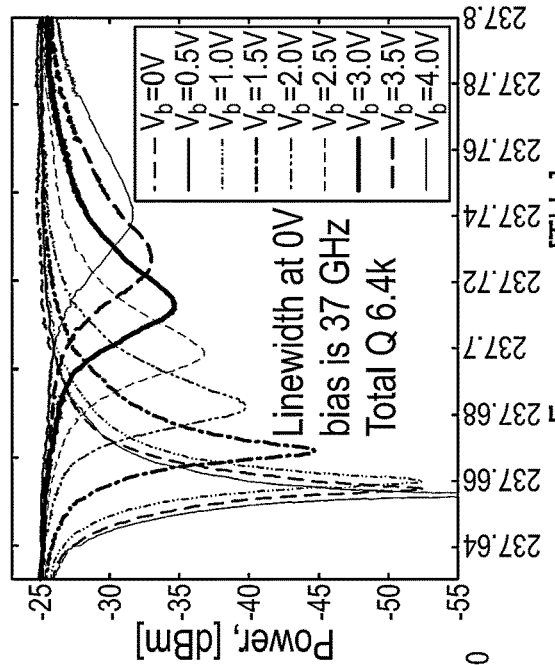
FIGS. 15A through 15D illustrate experimental data of a MOSCAP MRM experimental realization with 1.5 $\mu m$ radius and partial etch on the body device layer, the CAD layout of which is shown in FIGS. 3A-D.
Figure 15A:
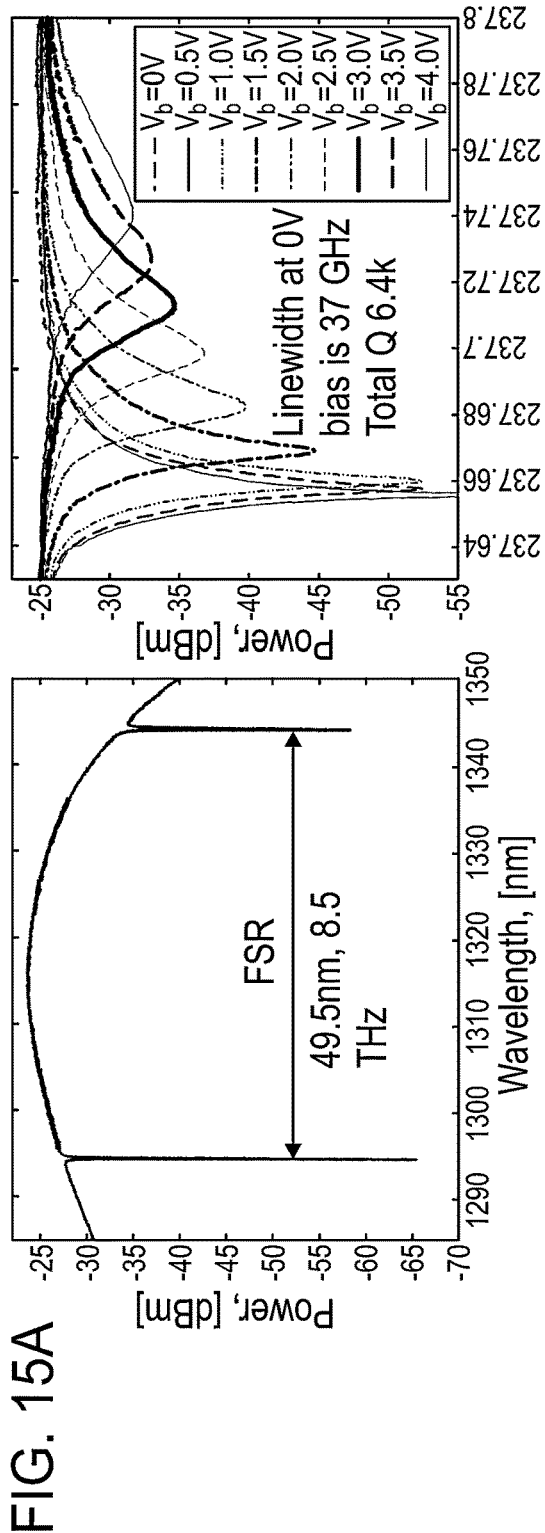
Figure 15D:
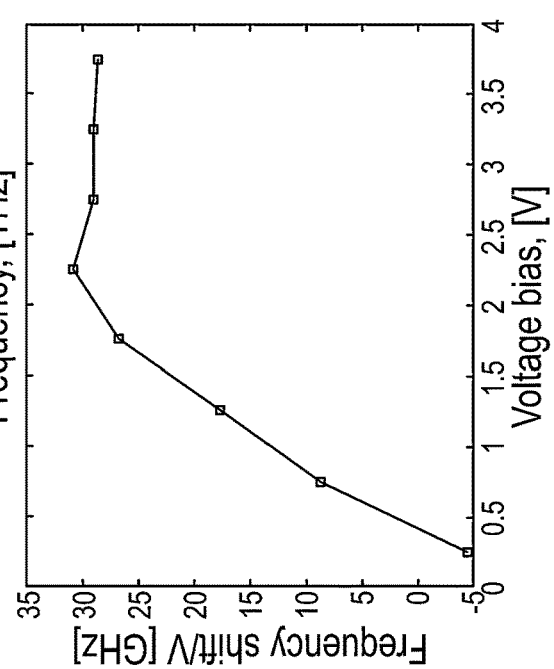
Figure 15C:
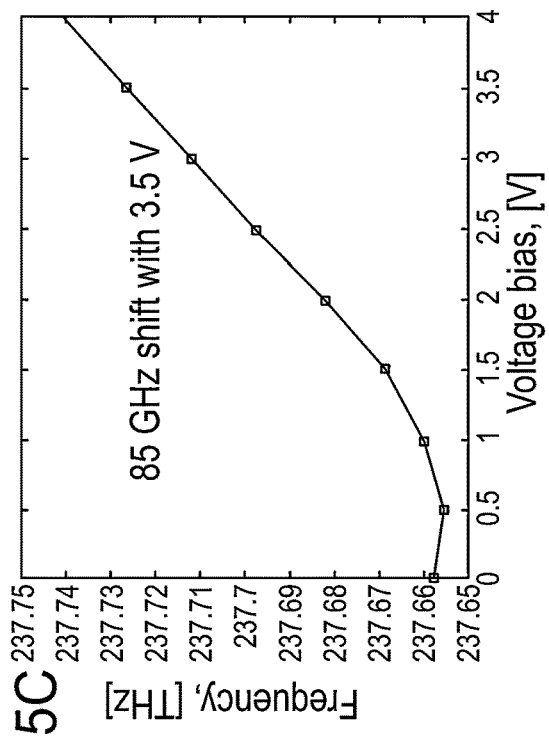

FIGS. 15A through 15D illustrate experimental data of a MOSCAP MRM experimental realization with 1.5 µm radius and partial etch on the body device layer, the CAD layout of which is shown in FIGS. 3A-D. The MOSCAP MRM is implemented in an electronic-photonic CMOS process. FIG. 15A shows passive optical transmission spectrum of the device with the two spectral dips corresponding to two longitudinal resonant modes separated in frequency by 8.5 THz FSR. The spectrum between the two resonances is clean, showing no spurious resonances that correspond to higher order modes. This is due to the single mode nature (width) of the waveguide cross-section, thanks to the partial etch in the body device layer. FIG. 15B shows transmission spectrum for different gate-body Vgb bias voltage magnitudes between 0 and 4 Volts into accumulation. Due to accumulation of charge carriers on the MOS capacitor, the resonance shifts to higher optical frequencies as the gate-body voltage increases. The accumulated charge also causes reduction of resonance quality factor, which results in reduction of resonance extinction ratio. FIG. 15C shows the measured dependence of resonance frequency on gate-body voltage extracted from the transmission spectra in FIG. 15B. At lower voltages corresponding to depletion regime of operation, the change in resonance frequency due to voltage change is slow. At higher voltages, when the MOSCAP MRM operates in the accumulation regime, the change in resonance frequency approaches its maximum value in this device of 30 GHz/V, which corresponds to the slope of the linear region in FIG. 15C. FIG. 15D shows the resonance frequency shift due to 1V change in gate-body voltage at different bias voltages. Large resonance shift efficiency besides allowing efficient modulation may also enable electro-optic tuning and locking of the MRM resonance frequency to the laser wavelength in WDM links with no static power consumption, eliminating or reducing the use of power-hungry thermal tuning commonly used in silicon MRMs.

Figure 16:
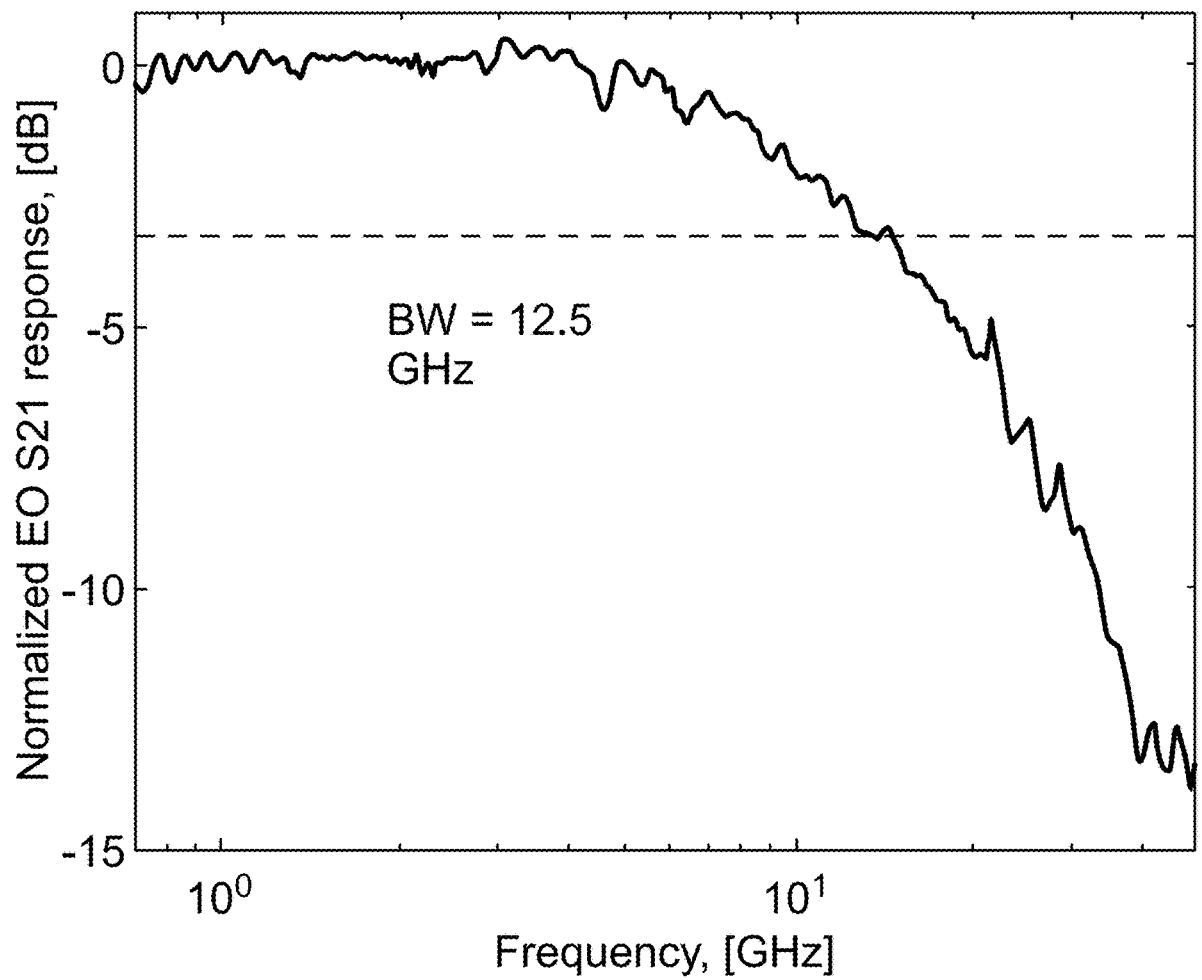
FIG. 16 illustrates the measured small-signal electro-optic S21 magnitude response of a MOSCAP MRM similar to the device whose DC electrical and optical characteristics are shown in figures FIG. 15A-D, showing 12 GHz bandwidth.

FIG. 16 illustrates the measured small-signal electro-optic S21 magnitude response of a MOSCAP MRM similar to the device whose DC electrical and optical characteristics are shown in figures FIG. 15A-D, showing 12 GHz bandwidth. The S21 electrooptical response measures the transmission magnitude when setting as input a sinusoidal electrical drive signal to the modulator, and measuring the output modulated optical power (for a fixed laser input power), as a function of drive RF frequency.

An important feature in MOS capacitor structures is to maximize the gate capacitance, C, for a given thickness of the insulating material (e.g. gate oxide). The gate capacitance is given approximately by $C=\varepsilon$ A/d, where $\varepsilon$ is the electromagnetic permittivity ($\varepsilon=\varepsilon_r \varepsilon_0$, where $\varepsilon_r$ is the relative dielectric constant of the insulating material and Co is the vacuum permittivity), A is the area of the "capacitor plates", and d is the thickness of the insulating material. Hence, a larger insulating material dielectric constant, Er, increases capacitance, without decrease of material thickness (which can lead to larger leakage currents due to e.g. tunneling across the barrier). Well known methods in microelectronics, in forming transistors, are to use "high-k" (i.e. high dielectric constant) dielectrics in the gate of a MOSFET transistor—materials such as hafnium dioxide ($HfO_2$), zirconium dioxide, or hafnium silicates and zirconium silicates, including nitrided versions of such silicates used in microelectronics processes. Such materials can increase the charge brought into the optical region of MOSCAP modulators disclosed in this invention and reduce the drive voltage required (increase the sensitivity), or reduce leakage current by allowing a thicker gate oxide insulator dielectric to be used.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A ring resonator optical modulator, comprising:
   a ring-shaped optical region in which optical radiation can propagate in a circular path, the ring-shaped optical region having an inner radius and an outer radius, the outer radius being coincident with an outer perimeter of the ring resonator optical modulator;
   a ring-shaped metal-oxide-semiconductor (MOS) capacitor structure having an upper gate device layer of the MOS capacitor structure and a lower body device layer of the MOS capacitor structure, and an insulating material being disposed between the upper gate device layer of the MOS capacitor structure and the lower body device layer of the MOS capacitor structure; and
   a cladding region comprising cladding material of lower refractive index than the refracting index of the upper gate device layer or the lower body device layer disposed radially outwardly from the outer perimeter of the ring-shaped optical region;
   the optical radiation being confined within the optical region, along the radial direction toward the inner side of the outer perimeter of the ring-shaped optical region, due to refractive index contrast between the upper gate device layer/lower body device layer and the cladding region;
   wherein the insulating material has a first region and a second region having a respective first thickness and second thickness, the second thickness being greater than the first thickness, the first region being disposed in the ring-shaped optical region, the second region being disposed radially inwardly from the inner radius of the ring-shaped optical region, such that the optical radiation is radially confined toward the outer side of the inner radius of the optical region within the ring-shaped optical region due to refractive index contrast between the ring-shaped optical region and the second region of insulating material.

2. The ring resonator optical modulator of claim 1, wherein the first thickness of the first region of the oxide layer is in a range of 1 to 10 nm.

3. The ring resonator optical modulator of claim 1, wherein the inner radius of the optical region is in a range of 0.5 to 50 um.

4. A ring resonator optical modulator, comprising:
   a ring-shaped optical region in which optical radiation can propagate in a circular path, the optical region having an inner radius and an outer radius, the outer radius being coincident with an outer perimeter of the ring resonator optical modulator;
   a ring-shaped metal-oxide-semiconductor (MOS) capacitor structure having an upper gate layer of the MOS capacitor structure and a lower body layer of the MOS capacitor structure;
   an insulating material being disposed between the upper gate layer of the MOS capacitor structure and the lower body layer of the MOS capacitor structure;
   and a cladding region comprising cladding material of lower refractive index than the refracting index of the upper gate device layer or the lower body device layer disposed radially outwardly from the outer perimeter of the ring-shaped optical region;
   the optical radiation being radially confined at the outer perimeter of the ring-shaped optical region within the optical region due to refractive index contrast between the ring-shaped optical region and the cladding material; and
   a first electrode electrically coupled to the upper gate layer of the MOS capacitor structure and a second electrode electrically coupled to the lower body layer of the MOS capacitor structure, the first and second electrodes being radially disposed radially inwardly from the inner radius of the optical region.

5. The ring resonator optical modulator of claim 4, wherein the inner radius of the optical region is in a range of 1 to 5 um.

6. The ring resonator optical modulator of claim 4, wherein the lower body layer of the MOS capacitor comprises a semiconductor material.

7. The ring resonator optical modulator of claim 4, wherein at least one of the first and second electrodes comprises a semiconductor material.

8. A resonant electro-optic modulator comprising:
   a closed-loop optical resonator supporting a guided-wave mode of confined optical radiation, the optical radiation mode's guidance being provided in a cross-section of the closed-loop optical resonator by refractive index confinement, the cross-section having a radially inward and a radially outward side with respect to the closed-loop optical resonator structure;
   the optical resonator including a first semiconducting material device layer having a first radially outward boundary and a second semiconducting material device layer having a second radially outward boundary, the first and second semiconducting material device layers each being doped to conduct electric charge carriers, and separated by an insulating material to form a metal-oxide-semiconductor (MOS) structure;

the insulating material comprising a first region having a first thickness and a second region having a second thickness larger than the first thickness and disposed adjacent the first region forming a boundary between the first and second regions of the insulating material;

wherein the first region of insulating material is disposed against the first radially outward boundary along the circumference of the structure, and the second region of insulating material is disposed radially inward from, and abutting, the first region of insulating material, such that the guided-wave mode of optical radiation is confined by refractive index confinement between the first and/or second radially outward boundary on the radially outward side of the mode of optical radiation, and the boundary between the first and second regions of the insulating material on the radially inner side of the mode of optical radiation;

the closed-loop optical resonator further having a first conducting electrode electrically connected to the first semiconducting material device layer, and a second conducting electrode electrically connected to the second semiconducting material device layer, such that application of a voltage across the first and second electrodes effects motion of charge into and/or out of the capacitor formed by the first semiconducting device layer, the first region of insulating material and the second semiconducting layer, and changes the effective refractive index seen by the mode of optical radiation.

9. The resonant electro-optic modulator of claim 8, wherein the first semiconducting material layer is disposed below the second semiconducting material layer, and the guided-wave mode of optical radiation is further confined between the lower boundary of the first semiconducting material layer and the upper boundary of the second semiconducting material layer.

10. The resonant electro-optic modulator of claim 8, where in the closed-loop optical resonator is a circular resonator.

11. The ring resonator optical modulator of claim 1, where the upper gate layer of the MOS capacitor comprises polycrystalline silicon, and the lower body layer of the MOS capacitor comprises monocrystalline silicon.

12. The ring resonator optical modulator of claim 1, where the upper gate layer of the MOS capacitor is p doped, and the lower body layer of the MOS capacitor is n doped.

13. The ring resonator optical modulator of claim 1, where the upper gate layer of the MOS capacitor is n doped, and the lower body layer of the MOS capacitor is p doped.

14. The ring resonator optical modulator of claim 1, where the upper gate layer of the MOS capacitor includes at least one region that is p doped in the ring-shaped optical region and at least one region that is p+ and/or p++ doped that is primarily outside the ring-shaped optical region, and the lower body layer of the MOS capacitor includes at least one region that is n doped in the ring-shaped optical region and includes at least one region that is n+ and/or n++ doped that is primarily outside the ring-shaped optical region.

15. The resonant electro-optic modulator of claim 9, where the second conducting electrode is connected to the second semiconducting material layer in a region of the second semiconducting material layer that is outside ring-shaped optical region, i.e., that coincides with the second region of the insulating material.

16. The resonant electro-optic modulator of claim 15, where the first conducting electrode is connected to the first semiconducting material in a region that is further radially inward from the second conducting electrode.

17. The ring resonator optical modulator of claim 11, wherein the lower body layer of the MOS capacitor is partially etched in the second region of the insulating material, and filled with insulating material, to make the second thickness of the insulating material larger than the first thickness (in the first region) of the insulating material.

18. The ring resonator optical modulator of claim 11, having a central region that is disposed radially inward from both the first and second regions of the insulating material, wherein the lower body layer of the MOS capacitor is partially etched in the second region of the insulating material, and filled with insulating material, to make the second thickness of the insulating material larger than the first thickness in the first region of the insulating material, and where electrical contact is made to the central region.

19. The ring resonator optical modulator of claim 1, where the upper gate device layer of the MOS capacitor comprises a material with higher optical propagation loss for the propagating optical radiation than the lower body device layer of the MOS capacitor, and where the upper gate device layer is thinner than the lower body device layer.

20. The ring resonator optical modulator of claim 19, where the upper gate device layer of the MOS capacitor is about a factor of 2 thinner than the lower body device layer.

21. The ring resonator optical modulator of claim 19, where the upper gate device layer of the MOS capacitor is between a factor of 1.2 and 4 thinner than the lower body device layer.

22. The ring resonator optical modulator of claim 11, wherein the lower body layer of the MOS capacitor is partially oxidized to a first depth to form the first region of the insulating material, and partially oxidized to a second depth to form the second region of the insulating material.

23. The ring resonator optical modulator of claim 11, wherein the first and the second thickness of insulating material are deposited in the first and second regions of the insulating material, on a planar surface of the lower body layer of the MOS capacitor.

24. The ring resonator optical modulator of claim 11, wherein a material layer is deposited in the first and second regions of the insulating material, on a planar surface of the lower body layer of the MOS capacitor, and then etched down to the first and the second thickness in respective first and second regions of the insulating material.

25. The ring resonator optical modulator of claim 4, further comprising a region of reduced effective index in the upper gate layer of the MOS structure, the region of reduced effective index comprising a full-etch patterning, with sub-wavelength size of features, of the upper gate layer of the MOS structure, the first electrode being electrically coupled to a radially inward portion of the reduced effective index region, and the optical radiation being radially confined to the radially outward side of the boundary between the region of reduced effective index and the ring-shaped optical region.

26. The ring resonator optical modulator of claim 25, further comprising a second region of reduced effective index in the lower body layer of the MOS structure, the second region of reduced effective index comprising a full-etch patterning, with sub-wavelength size of features, of the lower body layer of the MOS structure, the second electrode being electrically coupled to a radially inward portion of the second reduced effective index region, and the optical radiation being radially confined to the radially outward side of the boundary between the second region of reduced effective index and the ring-shaped optical region.

27. The ring resonator optical modulator of claim 26, where the first reduced effective region comprises first radial spokes, distributed azimuthally around the resonator, of upper gate layer material, and the second reduced effective region comprises second radial spokes, distributed azimuthally around the resonator, of lower body layer material, where the first and second radial spokes are azimuthally offset so as to reduce capacitance away from the ring-shaped optical region, and accommodate interdigitated respective contact of the first and second electrodes close to the optical region.

28. The ring resonator optical modulator of claim 27, where the second radial spokes are longer than the first radial spokes, and the second electrode is coupled to the lower body layer of the MOS capacitor structure at a further radially inward position than the radial position at which the first electrode is coupled to the upper body layer of the MOS capacitor structure.

29. The ring resonator optical modulator of claim 28, further comprising a solid region of the lower body layer of the MOS capacitor structure positioned radially inward from the second radial spokes, the second electrode being coupled to the lower body layer of the MOS capacitor in the solid region, to improve electrical properties of the device.

\* \* \* \* \*